United States Patent [19]
Calvignac et al.

[11] Patent Number: 4,819,230
[45] Date of Patent: Apr. 4, 1989

[54] OPTIMIZED BANDWITH ALLOCATION MECHANISM BETWEEN CIRCUIT SLOTS AND PACKET BIT STREAM IN A COMMUNICATION NETWORK

[75] Inventors: Jean Calvignac, LaGaude; Pierre Secondo, St. Jeannet, both of France

[73] Assignee: International Business Machines Corp., Armonk, N.Y.

[21] Appl. No.: 77,485

[22] Filed: Jul. 24, 1987

[30] Foreign Application Priority Data

Aug. 27, 1986 [EP] European Pat. Off. ........ 86430030.6

[51] Int. Cl.$^4$ .............................................. H04J 3/26
[52] U.S. Cl. ..................................................... 370/94
[58] Field of Search ...................... 370/60, 94, 79, 89, 370/85

[56] References Cited

U.S. PATENT DOCUMENTS

| | | | |
|---|---|---|---|
| 4,611,321 | 9/1986 | Garbrielli et al. ................. | 370/60 |
| 4,628,505 | 12/1986 | Paris ................................ | 370/110.1 |
| 4,663,755 | 5/1987 | Lewis ................................ | 370/60 |
| 4,718,062 | 1/1988 | Anderson .......................... | 370/94 |

FOREIGN PATENT DOCUMENTS

| | | |
|---|---|---|
| 0122765 | 4/1983 | European Pat. Off. . |
| 0168927 | 7/1984 | European Pat. Off. . |
| 2006574 | 4/1979 | United Kingdom . |

OTHER PUBLICATIONS

Patent Abstracts of Japan, vol. 6, No. 164, Aug. 1982.
"A Hybrid Switched Open Network for Voice and Data Services", by Fruchard, Proceedings of the International Switching Symposium, May 7-11, 1984; Florence, Italy.

Primary Examiner—Douglas W. Olms
Attorney, Agent, or Firm—Edward H. Duffield

[57] ABSTRACT

The invention relates to a mechanism to be used in an integrated packet/circuit switched telecommunication network. It allows instantaneously on a per slot basis, the re-allocation of unused bandwidth left by a circuit user source to the background packet flow, and allows giving it back to the circuit source as it resumes its activity. The circuit user data Cd are sent through the network during slots of frames which are assigned to the circuit users on a per- call basis. Interfacing means (30, 32) are provided to generate slot qualifying bits Caq which are set to a first value when the corresponding circuit users are active and to a second value when the corresponding cirucit users are inactive. These qualifying bits are transported through the network in correspondence with the slot they qualify and sensed to cause the slots having a Caq set to the second value to be filled with packet bits.

4 Claims, 18 Drawing Sheets

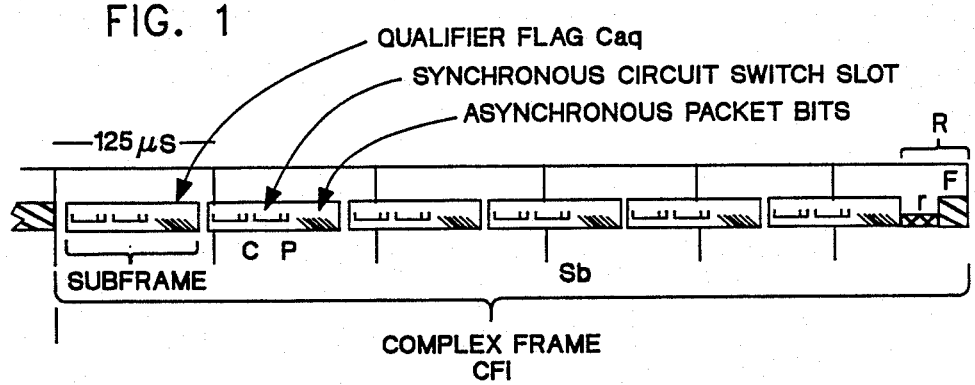
FIG. 1
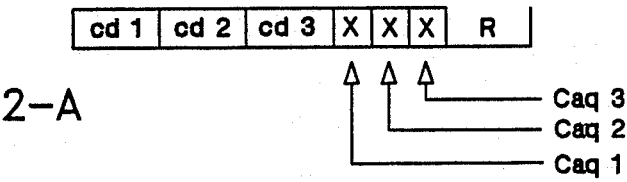
FIG. 2-A
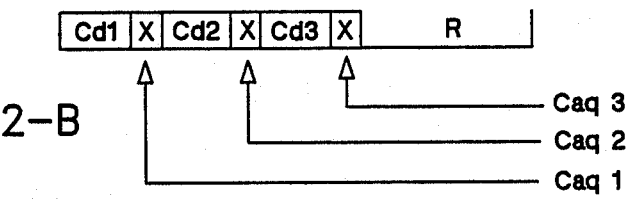
FIG. 2-B
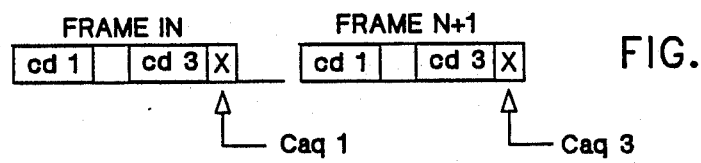
FIG. 2-C

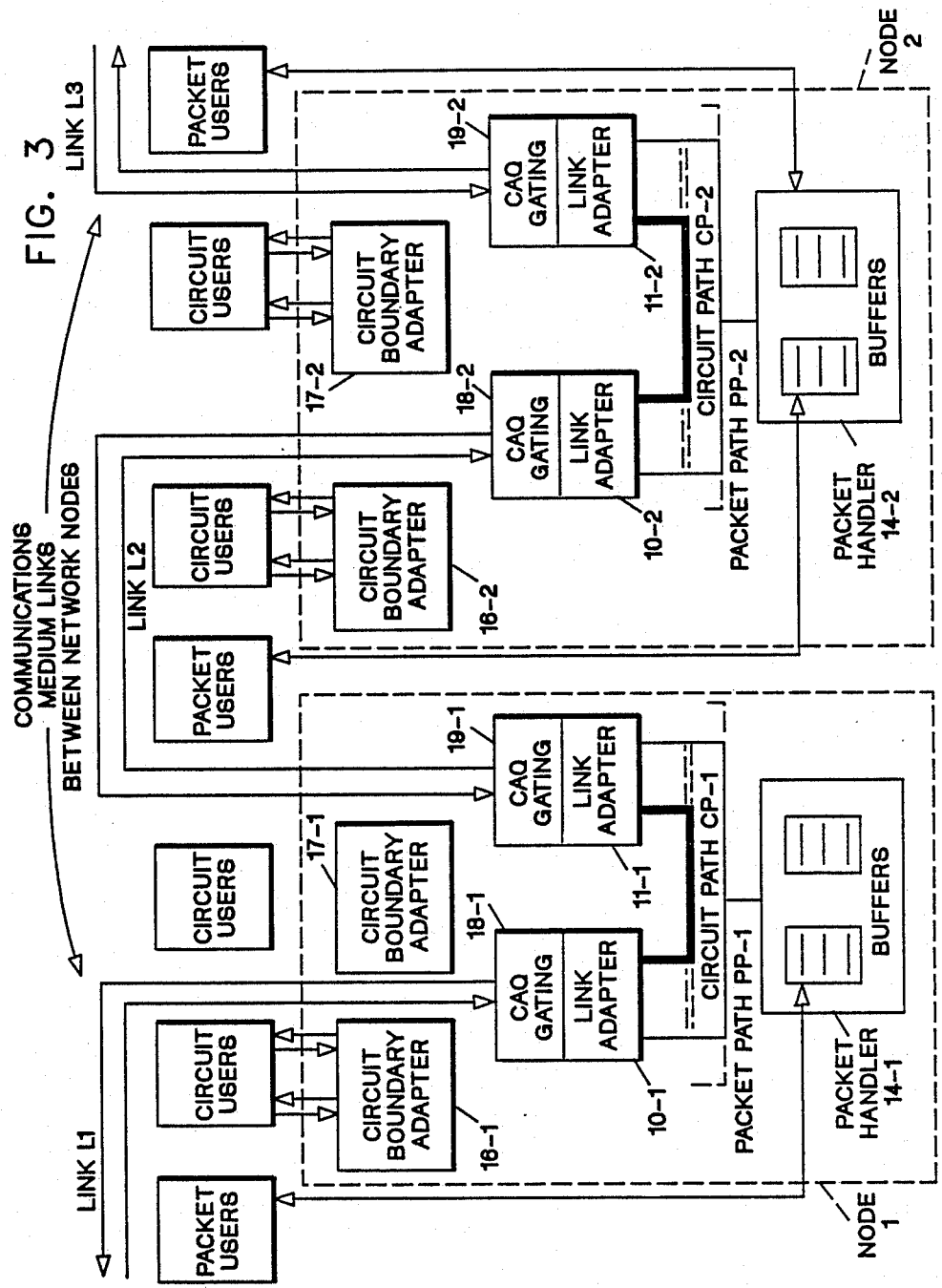

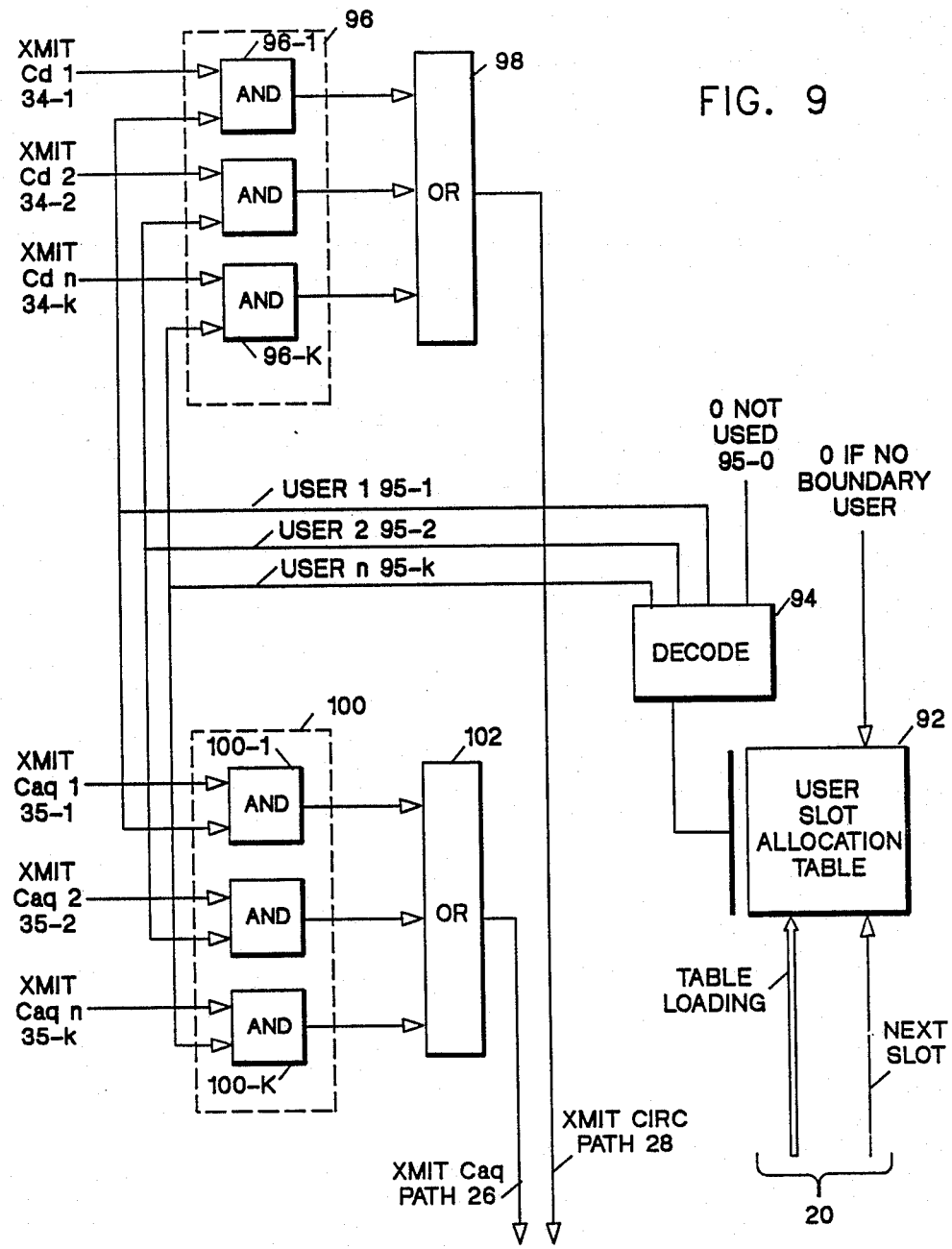

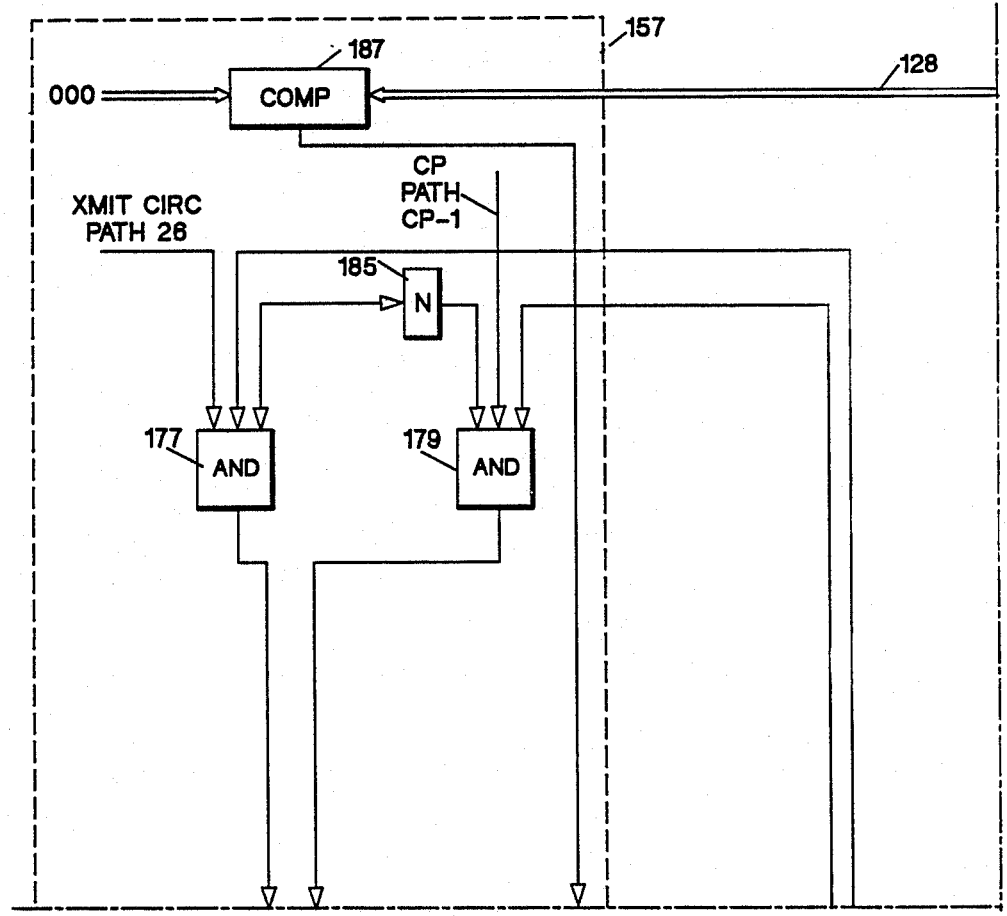

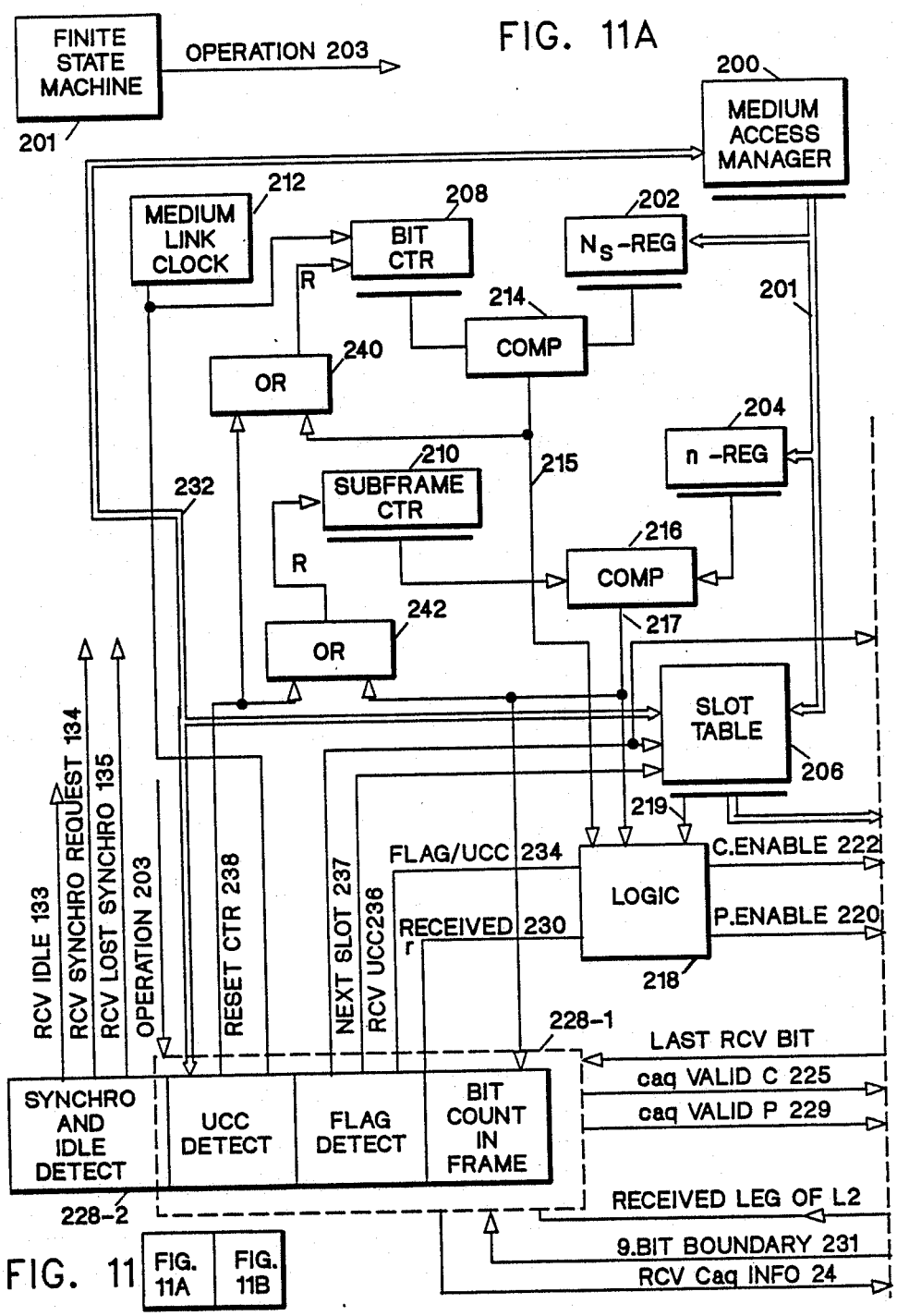

OPTIMIZED BANDWITH ALLOCATION MECHANISM BETWEEN CIRCUIT SLOTS AND PACKET BIT STREAM IN A COMMUNICATION NETWORK

DESCRIPTION OF THE INVENTION

1. Field of the invention

This invention relates to a mechanism to be used in a packet/circuit switched system for dynamically reallocating the bandwidth left on a circuit switched connection, during short periods of time where the circuits are not actively used.

2. Background of the invention

Future communication networks will have to accommodate packet switched as well as circuit switched traffic. Different ways for realizing this merger are known. However in the long range, only the most economical methods will survive. The best methods are the ones that continually optimize the utilization of the telecommunication resources.

A method that allows adaptive sharing of network nodes and the inter-node links is the object of co-pending, commonly assigned Eurpoean patent application No. 85 4300274 filed on Aug. 13, 1985.

A method that allows dynamic allocation of bandwidth on an inter-node link on a per call basis, is the object of co-pending, commonly assigned European patent application No. 85 4500266 filed on Aug. 13, 1985.

When combined in a telecommunication network, the above two methods allow the network to provide very efficient packet switched and circuit switched services. For each call, the total available bandwidth is rearranged to give the best possible throughput according to the actual traffic profile.

However, since the time granularity of the bandwidth re-distribution equals the circuit switched call duration, the bandwidth unused during the silent periods is lost. If while a circuit is established, the source is not active all the time, this is known as "bursty" traffic.

Among the many examples of "bursty" circuit switched traffic sources, themost typical are:

voice applications, where the channel is used less than 45% of the time, and/or where packetization techniques have been used for improving the bandwidth utilization of the network links, despite the inherent drawbacks of packetization, i.e. delays and jitter.

circuit switched data applications, where interactive terminals work in switched mode, i.e., X.21 terminals; in these applications the line occupation rate is even lower than 45% and it has been necessary to implement complex CALL/CLEAR operating procedures (SHORT HOLD mode operation) to improve the operational cost of the system.

OBJECTS OF THE INVENTION

An object of the invention is to provide an improved mechanism for providing instantaneous temporary re-allocation of unused bandwidth in bursty traffic sources to the packet flow in an integrated packet/circuit switched telecommunication network, and to-reallocate said bandwidth back to the circuit sources as they result their activity.

SUMMARY OF THE INVENTION

The mechanism according to the invention is to be used in a communicatio network comprising a plurality of nodes for exchanging non character coded information (NCI) such as voice or image information exchanged in circuit switched mode and character coded information such as data exchanged in packet sw which are assigned to circuit users on a call basis, the remaining part of said frames being assigned to packet switched types of traffic. The nodes comprise means for transporting the circuit user's data in the assigned slots from originating users to destination users. The mechanism is characterized in that the network boundary nodes connected to boundary circuit users include interfacing means (30, 32) including the following:

Apparatus (30-T, 32-T) for dynamically and instantaneously qualifying the circuit slots. Qualifying the circuit slots means, depending upon the user activity detected on a slot basis, setting a qualifying bit to a first value indicating that the slot is assigned to a boundary circuit user or to a second value indicating that the slot is momentarily free and may be assigned to the packet switched traffic. The qualifying bits are then transported through the network in correspondence with the slots they qualify.

Further, the mechanism includes apparatus (30-R, 32-R) responsive to received qualifying bits and to received data bits for reconstructing therefrom the boundary circuit user bit streams. The bit streams comprise the user data bits whn the qualifying bits are found equal to the first value and are idle bit configurations when the qualifying bit is found equal to the second value.

BRIEF DESCRIPTION OF THE DRAWINGS

FIG. 1 illustrates a type of message frame which may be used for implementing the present invention.

FIGS. 2-A to 2-C illustrate circuit slots with a frame with their corresponding qualification bits.

FIG. 3 schematically illustrates nodes of a communication network incorpoating the mechanism according to the present invention.

FIG. 9 illustrates the transmit portion of the circuit boundary adapter.

DETAILED SPECIFICATION

Figure 4:
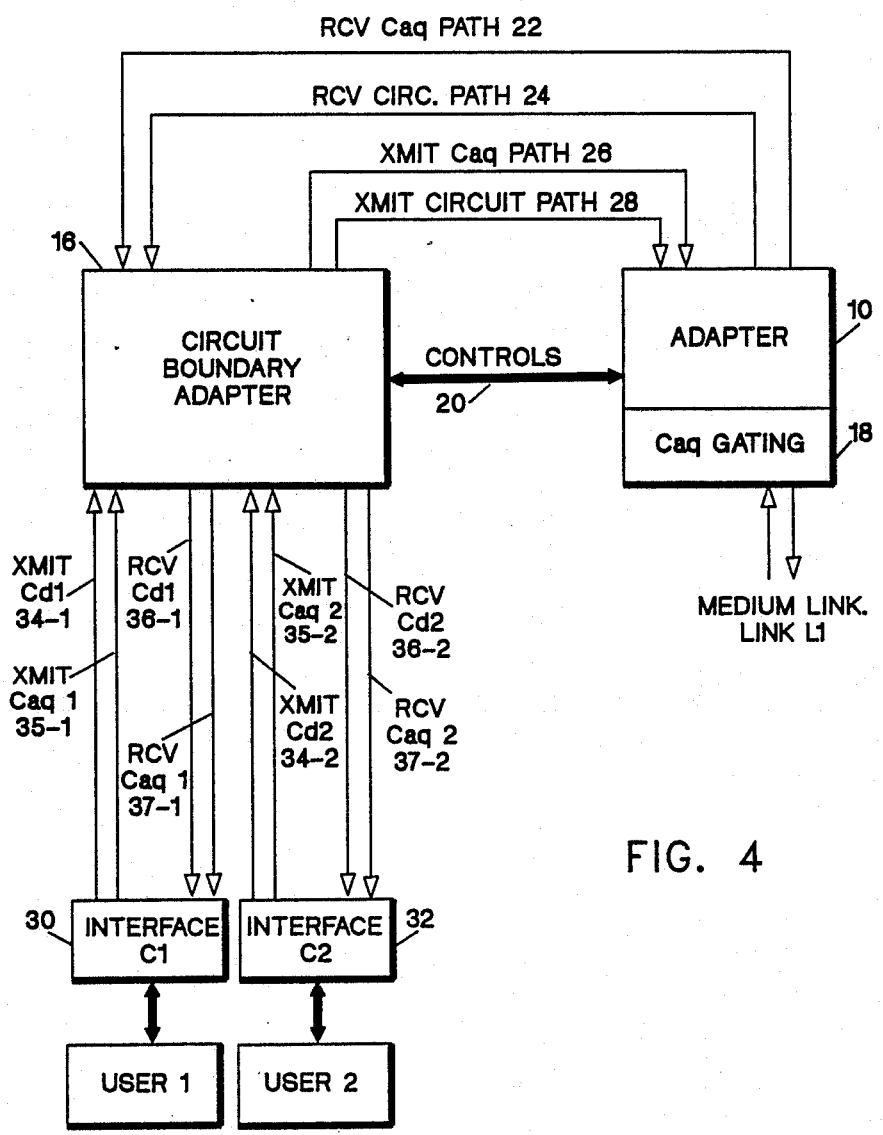
FIG. 4 schematically illustrates one link adapter and its associated circuit boundary adapter.

The mechanism of the present invention may be used in conjunction with any frame structure comprising channels devoted to the transportation of circuit switched bits and packet switched bits. Such a structure may be found in the Integrated Service Digital Network ISDN frames. Such a structure is the frame described in European Patent Applications 85 4300274 and 85 4300266.

The principle of the present invention is to associate with each circuit switched user channel, a subchannel transporting activity qualification information. This qualification information relative to a given circuit switched channel is transported synchronously with the qualified data slots.

If Cd is the synchronous subchannel used of user data traffic and Caq the associated synchronous subchannel used for user activity qualification, the rule for partitioning the bandwidth between Cd and Caq subchannels is user dependent and can be different for different user applications. The optimum performance is obtained when the following ratio is at a minimum: Caq bandwidth/re-used Cd bandwidth.

The Caq and associated Cd channel bit positions in the transmission medium frame are to be determined at the system level and chosen in order to minimize the above ratio according to the traffic characteristics.

For the purpose of illustration, it will be assumed that the invention is incorporated in a mechanism allowing the bandwidth to be dynamically allocated between circuit slots and the packet bit stream as described in the European patent application No. 85 4300266. In such a mechanism the transmission medium frame has the structure shown in FIG. 1.

The communication frame is a complex frame CFi delimited by flags F, and comprises a number of subframes comprising a fixed number of bits and residual bits r. The complex frame contains a number Nc of bits which vary only by one in the successive subframes. The complex frame has a duration equal to nT+e where T is the conventional time division multiplex slot duration which for the present example is equal to 125 microseconds, and where n is an integer equal to or higher than 1 and where e is a value lower than a communication link bit transmission period. The parameter n depends on the line speed and is calculated as fully described in the above-referenced patent application.

The complex frame contain n subframes. Each subframe has a duration equal to or less than T and contains an integral number *Lbk.Ns*Rbk. of bits. The Ns bits of a subframe are allocated to the transportation of a variable number of circuit switched bit slots. The number of slots depends upon the user need. Two slots are represented in the example of FIG. 1 and the remaining slots are allocated to the transportation of packet switched data bits.

The mechanism described in the above referenced patent application dynamically allocates the circuit user bit slots to active users on a call basis. This means that during the duration of a call a given slot in successive subframes of successive complex frames is assigned to a given circuit user. The subframe structure changes depending upon the number of circuit users involved in a call. Therefor the number of packet bits of the subframes varies.

The complex frames are delimited by an f-bit long flag where f is part of the R bits remaining at the end of the complex frame, where R=Nc—nNs. In cases where R is higher than f, the r=R—f bits are filled with packet switched bits.

According to the invention any position of the qualification bits relative to the circuit slots defined on a call basis in the subframes is possible.

All the Caq bits of a communications medium complex frame may be grouped altogether or the Caq bits of a subframes may be grouped together or the Caq bits can be concatenated with the circuit slot which they qualify.

In FIG. 2-A, the activity qualification bits Caq1, Caq2, Caq3 for a communications frame that contains only one subframe and three circuit slots: Cd1, Cd2, Cd3, are grouped at the end of the frame.

In FIG. 2-B each circuit slot Cdi has its own Caqi concatenated to it.

There is a compromise between the non activity period average duration and the Caq subchannel overhead.

If one bit is taken as Caq subchannel to qualify eight bits of a typical Cd 64 kbps subchannel, this gives a slot by slot qualification of the Cd subchannel. In this case, the overhead is one-eighth or 12.5% and with the above voice example the re-used bandwidth on each 64 kbps voice channel would be:

$$64 kbps\ (100\% - 112.5 \times 45\%) = 31.7\ \text{kbps}$$

The overhead of the Caq subchannel can be reduced by time multiplexing several Caq qualification information bits on the same Caq slot. This means that, depending upon the communication medium frame numbers, a given Caq bit qualifies different Cd subchannels. This is schematically represented in FIG. 2-C.

An embodiment of the present invention will be described assuming that the frames which are exchanged on the inter node links have the structure of the complex frames described above. However, one skilled in the art will be able to implement the concept of the invention in any other transportation mechanism for merged circuit switched and packet switched bit stream.

The network nodes are schematically shown in FIG. 3. They comprise most of the components described in above referenced patent applications together with specific means allowing the qualification bits to be processed and used for routing the bits to be received or to be transmitted in the circuit slots depending upon the circuit user activity.

FIG. 3 shows two nodes of the telecommunication network. Each node comprises similar means which are referenced by the same number with a suffix 1 for the means in node 1 and a suffix 2 for the means in node 2. Each node comprises a plurality of communications medium link adapters such as 10 and 11. These comprise receiver/transmitter pairs and including specific means which are needed to implement the concept of the invention. The adapters are connected to communications medium links such as L1, L2, L3, each link having a specific speed. Thus, the complex frames on the different links may have different configurations when the mechanisms described in above referenced European patent applications are used. In that case, the parameters n, (number of subframes in the complex frames), Ns (number of bits in the subframes) and r (number of residual bits) are made known to the corresponding receiver means so that the received bits may be processed.

Two paths are provided in each node. One path Cp is dedicated to the circuit switched bits (synchronous path) which have to be transmitted with a constant and very short delay (<500 microseconds). The other path PP is dedicated to the packet switched bits (asynchronous path) which are buffered and processed in packet handling means 14.

Circuit boundary adapters 16 and 17 are added to adapter 10 and 11 to attach the circuit users to the boundary nodes. These adapters handle the Caq bits according to the present invention. The packet users connected to the boundary nodes are directly connected to the packet handling means 14.

In the adapters 10 and 11 such as described in the above referenced European patent applications, gating means 18 and 19 respectively, which are responsive to the Caq bits, are provided to gate the circuit slot bits either to the circuit path or to the packet path depending upon the Caq values. These means will be described in reference to FIGS. 10 to 13.

FIG. 4 represents in more detail, the assembly comprising one adapter such as 10, the associated circuit boundary adapter such as 16, the gating means 18 and the connection with the circuit users. The assembly comprising adapter 11 and circuit boundary adapter 17 in each node is similar.

Circuit boundary adapter 16 and adapter 10 exchanges control signals through bus 20.

Adapters 10 and 16 are linked by receive Caq path and receive circuit paths 22 and 24, respectively and by transmit Caq path and transmit circuit paths, 26 and 28, respectively.

Circuit boundary adapter 16 is connected to boundary node users. Two such users (user 1 and user 2) are shown in FIG. 4. These users are connected to the adapter 16 through interface circuits C1 and C2, 30 and 32, which handle the receive and transmit circuit switched bits from the users and the associated Caq bits.

Circuits 30 and 32 are connected to adapter 16 through transmit lines "Xmit Cd", line 34 and "Xmit Caq", line 35 and though receive lines "RCV Cd", line 36 and "RCV Caq", line 37. In FIG. 4, these lines are referenced with a suffix 1 or 2, indicating that they are connected to circuit 30 or 32, respectively.

Circuits 30 and 32 are the interfaces between boundary node users, which are called the "end users" and the circuit boundary adapter 16. These circuits include different components depending upon the end user type.

Figure 5:
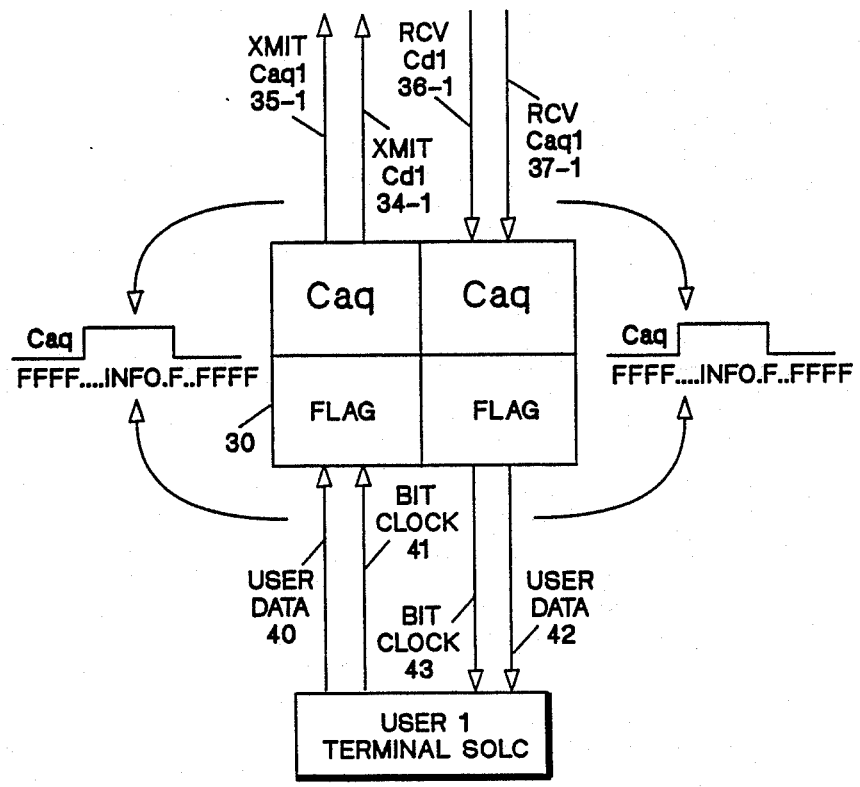
FIG. 5 schematically illustrates the interface circuit 30 for use with an SDLC terminal.
Figure 6:
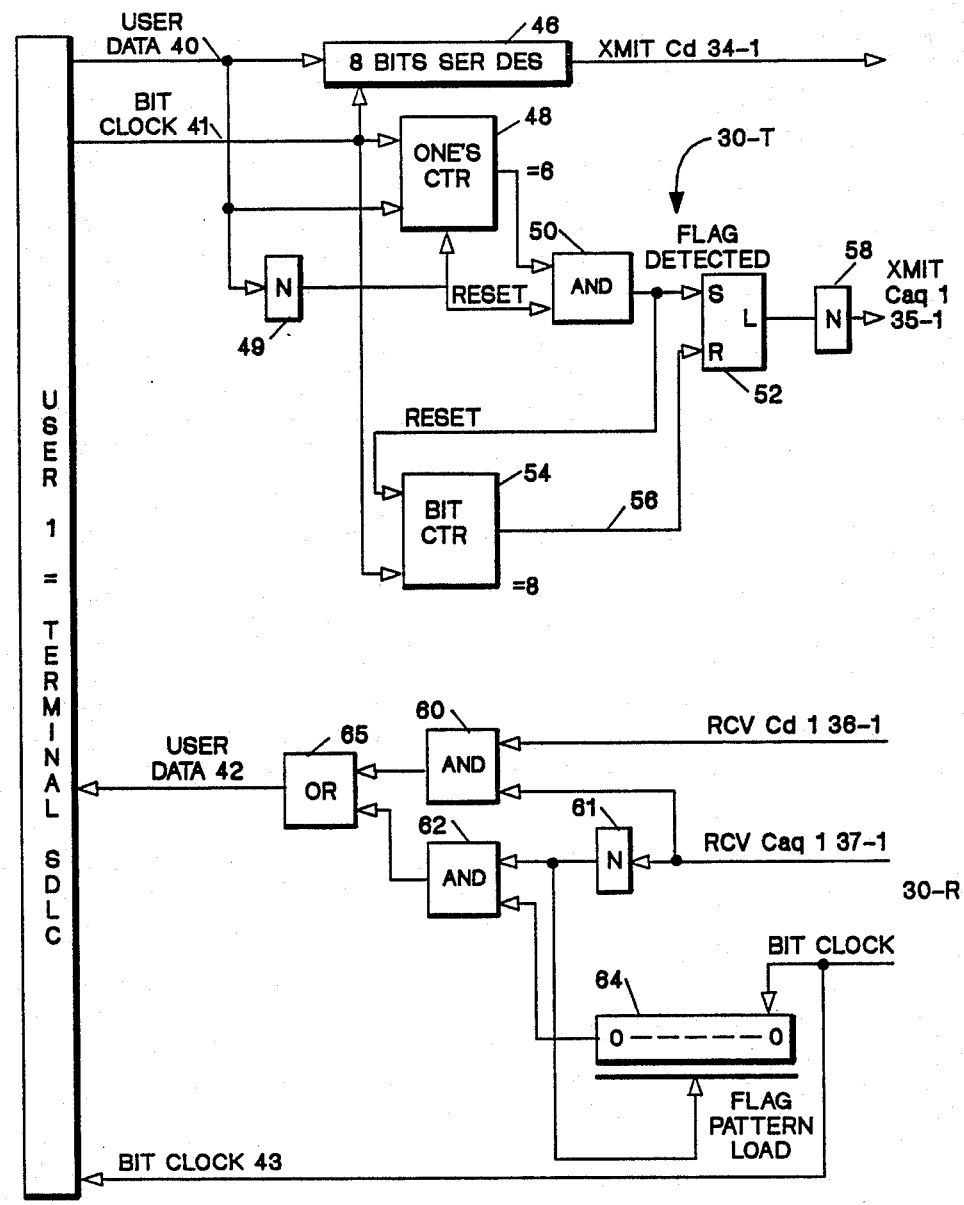
FIG. 6 illustrates the interface circuit 30 in more detail.

As an example, circuit 30 which is shown in FIGS. 5 and 6, may be used to connect and SDLC (SDLC stands for Synchronous Data Link Control). user terminal. Such a terminal sends the user data on line 40 under control of a bit clock signal on line 41 and receives the user data on line 42 under control of a bit clock signal on line 43.

In this example it is assumed that, during the non activity periods, the terminal sends flags F. Consequently, the XMIT Caq is generated on line 35-1 by transforming the flags into the Caq value as schematically shown in FIG. 5. The RCV Caq on line 37-1, when found to be zero, is transformed to flags F.

Note: If during the Idle period, the terminal sends "All MARK" (continuous ones), as is also allowed in the SDLC protocol. The same mechanism may be implemented so that the Flag pattern is replaced by an All ones pattern.

Circuit 30 is represented in more detail in FIG. 6.

The user data on line 40 is inputted into an 8-bit serializer-deserializer 46 which provides the XMIT Cd1 data on line 34-1 under control of the bit clock signal on line 41. The user data is also provided to one's counter 48 and to inverter 49. The output line of inverter 49 is connected to the reset input of counter 48 and to one input of AND gate 50. Thus each time a zero is found in the input data, counter 48 is reset. When counter 48 counts six ones, AND gate 50 is conditioned and if the next bit is found equal to zero, AND gates 50 provides an active signal indicative of a flag. This sets latch 52 and resets bit counter 54. Bit counter 54 counts the bit clock periods and provides an active signal in its output line 56 when eight bit periods are counted. This signal resets latch 52. The output of latch 52 is inverted by inverter 58, which provides on its output line 53-1, the XMIT Caq1 information.

The RCV Cd1 bits are provided through line 36-1 to AND gate 60 which is conditioned by the RCV Caq1 information received on line 37-1. The RCV Caq1 is inverted in inverter 61, the output signal of which conditions AND gate 62. Register 64 stores the flag configuration, which is provided to one input of AND gate 62 when the RCV Caq is found equal to 0. The output lines of AND gates 60 and 62 are provided to OR gate 65 which thus provides the user data or flags on output line 42 to user 1.

Figure 7:
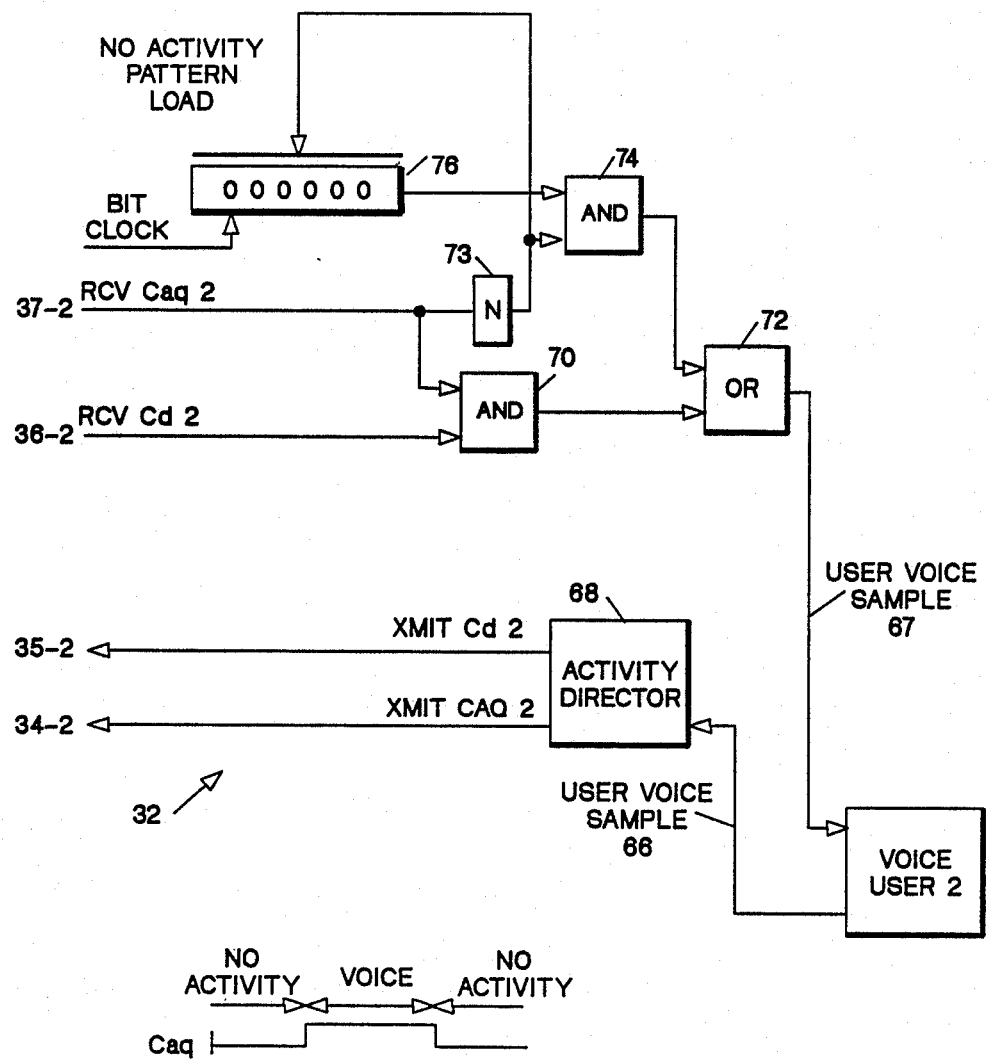
FIG. 7 illustrates the interface circuit 32 to be used with a voice terminal.

FIG. 7 shows an interface circuit which may be used as circuit 32, assuming that user 2 is a voice terminal.

Voice user 2 sends voice samples on line 66 and receives voice samples on line 67. Line 66 is connected to a voice activity detector 68 which sets the XMIT Caq2 to the 0 or 1 value depending upon the voice activity and sends the voice samples on line XMIT Cd2 35-2.

The RCV Cd2 bits on line 36-2 are provided to AND gate 70 which is conditioned by the RCV Caq2 on line 37-2, to provide the RCV Cd2 bits to line 67 through OR gate 72. RCV Caq2 is inverted in inverter 73, the output line of which is provided to one input of AND gate 74. Thus during the non activity period, AND gate 74 is conditioned and the zeros which are stored in register 76 are provided to line 67 through OR gate 72.

Figure 8:
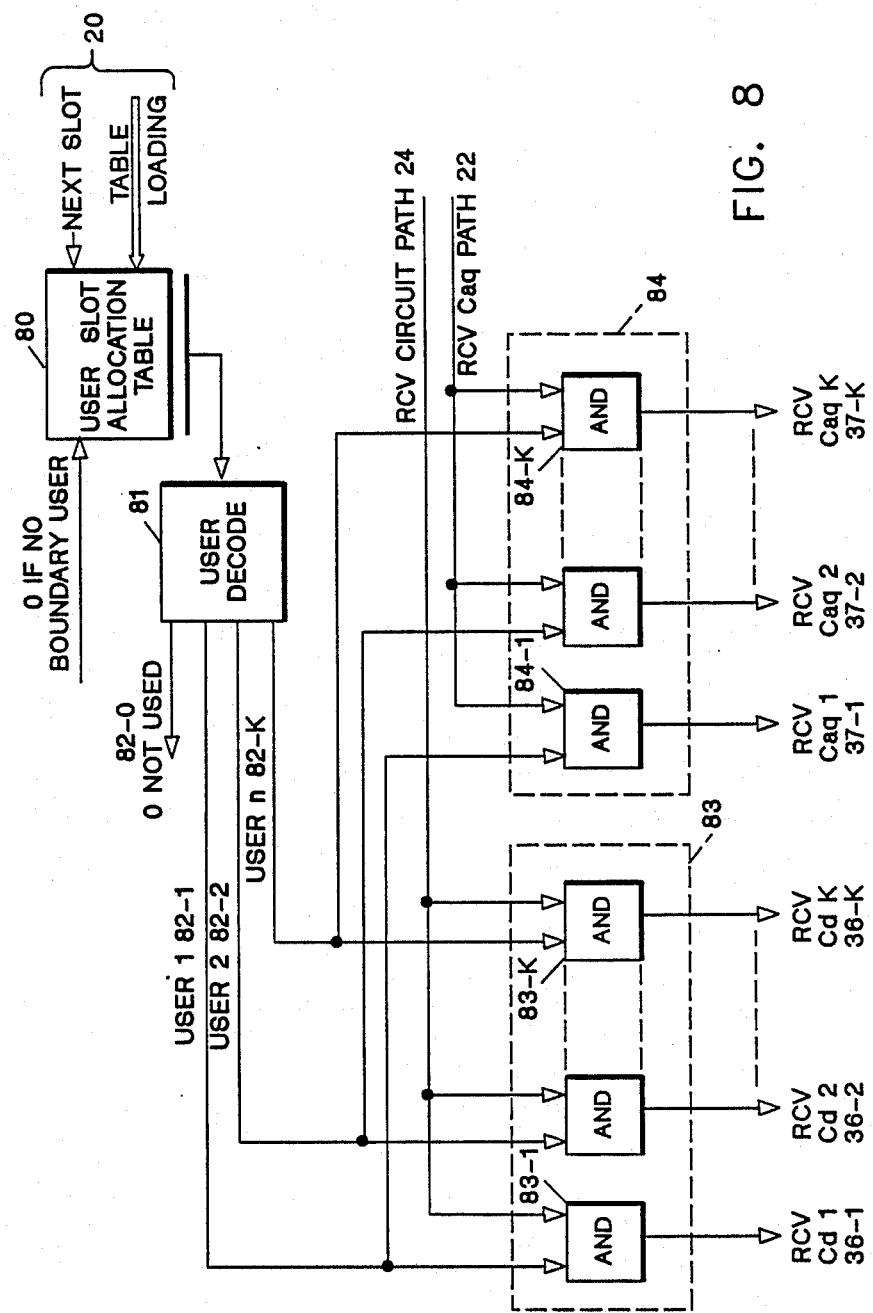
FIG. 8 illustrates the receive portion of the circuit boundary adapter.

FIG. 8 shows the receive portion of the circuit boundary adapters such as 16.

It comprises a user allocation table 80 which is loaded and updated by the node medium access manager so as to contain the correspondence table between the slot numbers on the receive leg of medium link such as L1 (FIG. 3) and the end users connected to the boundary node. Zeros are stored in correspondence to the slot numbers which are not assigned to end users. This table is scanned under control of a NEXT SLOT signal on bus 20 from adapter 10. The user identification information which is read from table 80 is decoded in circuit 81, which generates a signal on one of its output lines 82.

Assuming that the maximum number of slots which may be assigned to circuit users is 32, the user identification information corresponding to each slot may be contained in a 5-bit information field. If there is no end user associated to one slot, zeros and stored in correspondence to said slot and when this position of table 80 is read, line 82-0 of circuit 81 is activated.

The output lines 82-1 to 82-k of circuit 81 are provided to gating circuits 83 and 84 which comprises k AND gates 83-1 to 83-k and 84-1 to 84-k.

AND gates 83-1 to 83-k and 84-1 to 84-8 are conditioned by the signals on output lines 82-1 to 82-k, respectively.

RCV circuit path 24 is connected to one input of AND gates 83-1 to 83-k, and RCV Caq path 22 is connected to one input of AND gates 84-1 to 84-k.

Thus, AND gates 83-1 to 83-k and AND gates 84-1 to 84-k provide on their outputs 36-1 to 36-k and 37-1 to 37-k, the RCV Cd1 to RCV Cdk and the RCV Caq1 to RCV Caqk, respectively.

FIG. 9 illustrates the transmit portion of boundary node adpater 16. As the receive part, it comprises a user allocation table 92 which stores the correspondence between the slot numbers on the transmit leg of link such as L1 and the end users connected to the boundary node. Zeroes are stored in correspondence to the slot numbers which are not assigned to end users. This table is loaded and updated under control of the node access manager and it is scanned under control of a NEXT SLOT signal provided by adapter 10 on bus 20.

The information read from table 92 is provided to decode circuit 94, which provides an active signal on one of its output line 95-0 to 95-k. The active signal on line 95-0 indicates that the addressed position does not correspond to any user.

The XMIT Cd1 to Cdk lines 34-1 to 34-k from interface circuits such as 30 and 32 are provided to gating circuit 96 comprising AND gates 96-1 to 96-k which are conditioned by the active output signals on lines 95-1 to 95-k, respectively. The output signals from AND gates 96-1 to 96-k are provided to OR gate 98, the output line of which is the XMIT CIRC PATH 28.

The XMIT Caq1 to XMIT Caqk on lines 35-1 to 35-k are provided to gating circuit 100 which comprises AND gates 100-1 to 100-k, which are conditioned by the active output signals on lines 95-1 to 95-k, respectively. The output signals from AND gates 100-1 to 100-k are provided to OR gate 102, the output line of which is the XMIT Caq path 26.

Assuming that the complex frames on the medium links have the structures described in above referenced patent applications, FIGS. 10 to 13 show how the link adapters have to be modified to take into account the Caq information and route the circuit or packet switched bits accordingly.

Figure 10B:
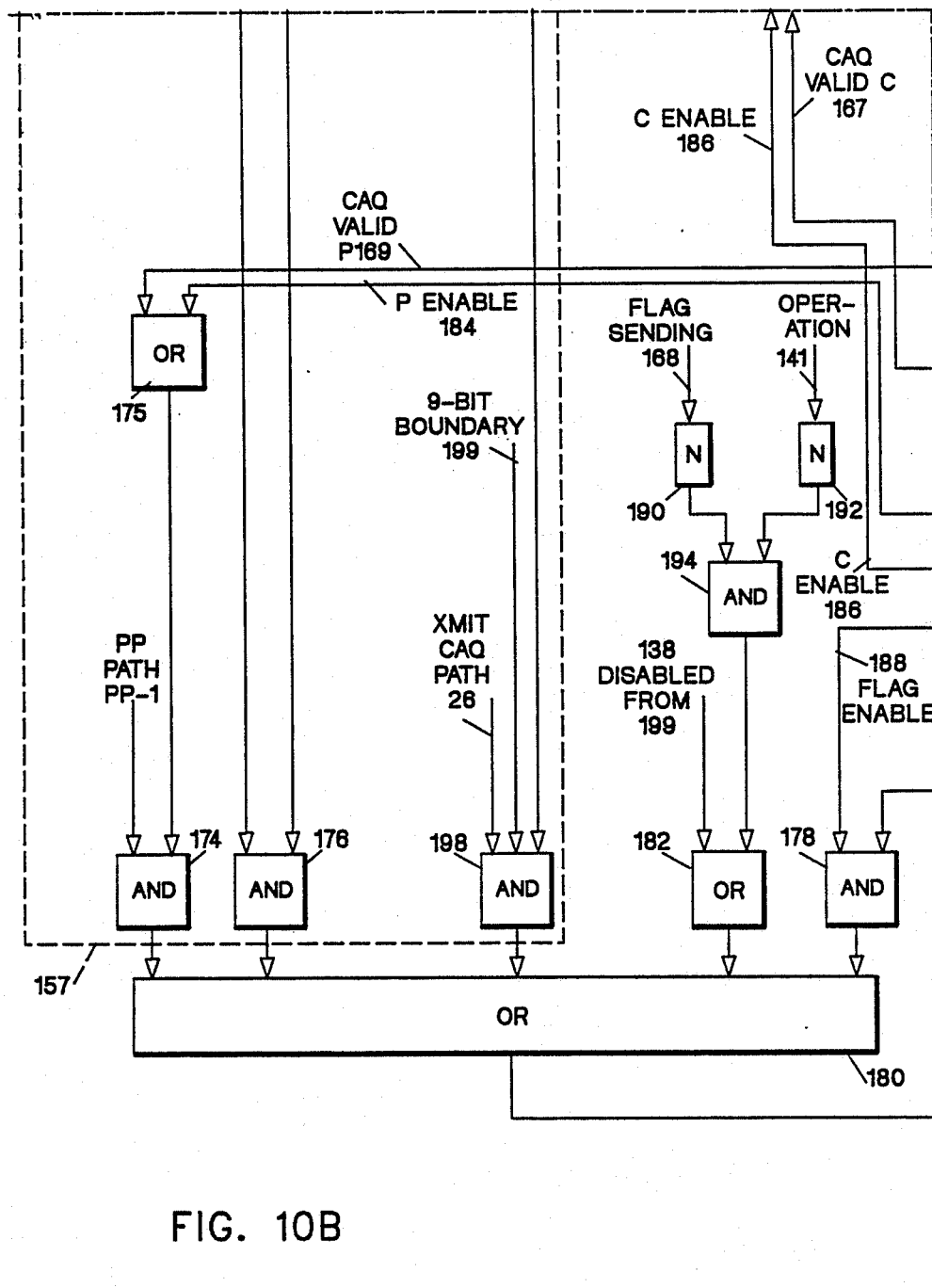
FIGS. 10-A and 10-B illustrate the transmit portion of the link adapter of FIG. 3.
Figure 10C:
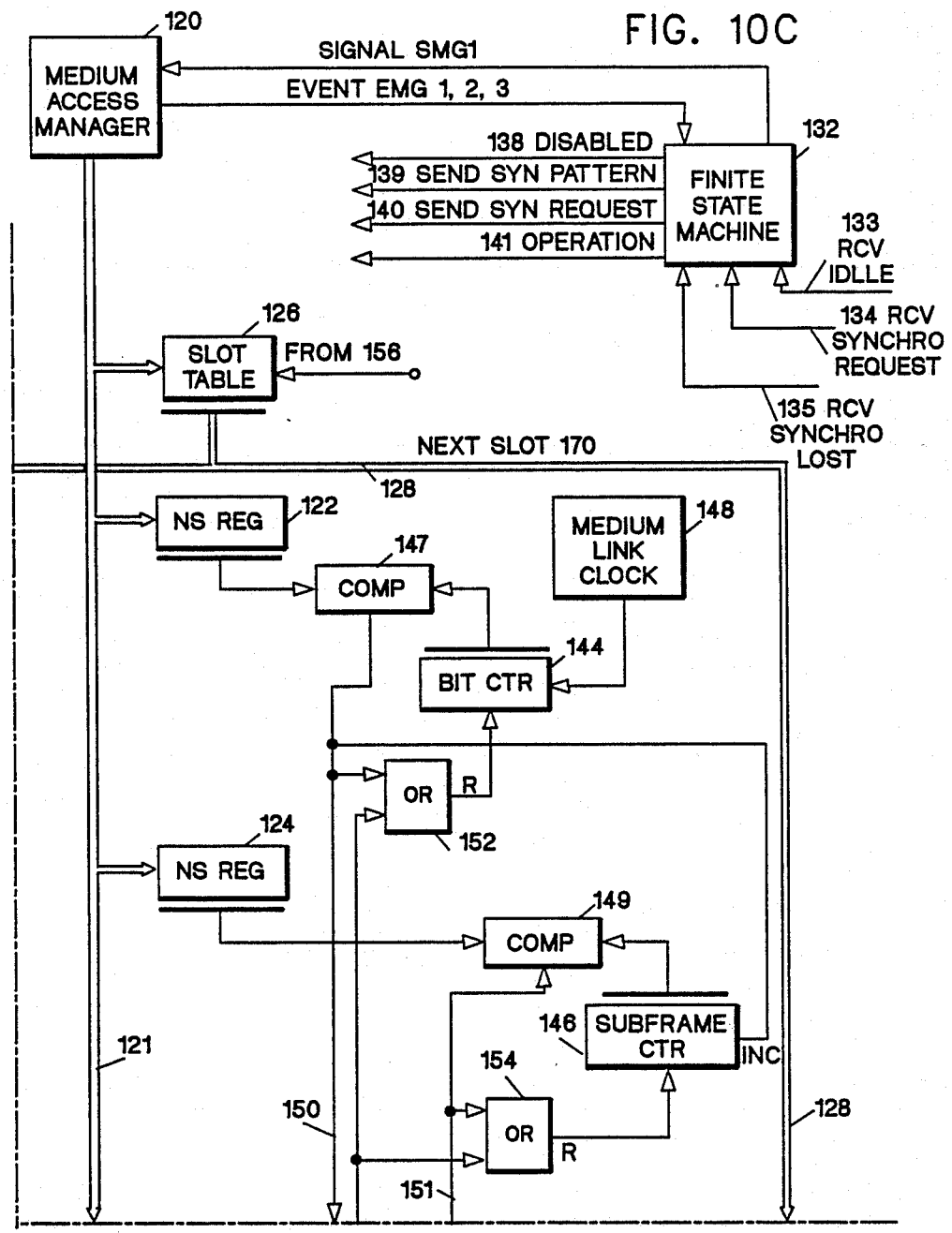
Figure 10D:
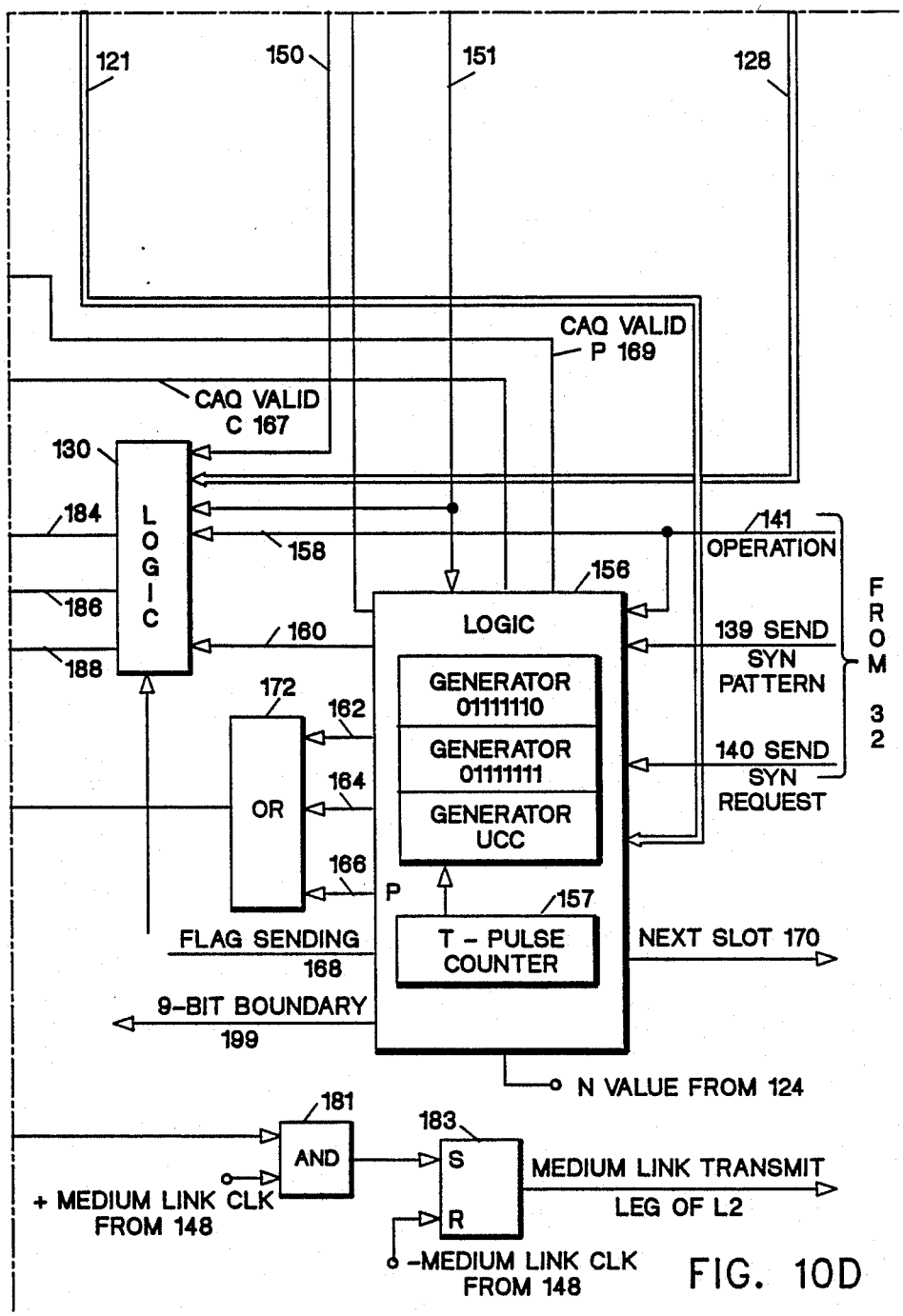

FIG. 10 (comprising FIGS. 10A and 10B) shows the transmitting means of adapter 10 or 11 which allows the circuit user bits attached to associated boundary adapter 16 or 17 to be sent on medium link L1 or L2. It will be assumed that the transmitting means represented in FIG. 10 are the means which allow adapter 11-1 to send the end user circuit bits connected to circuit boundary adapter 17-1 on the transmit leg of medium link L2.

In the preferred embodiment of the invention the slot assignment on the links which are used for routing the call, is controlled on a per-call basis through the mechanism described in above referenced patent applications. In these descriptions each node comprises a switching table which is updated by th node service manager so as to correlate the complex frame slot number on the receive leg of an input link of the node to the complex frame slot number on the transmit leg of the output link which is selected for routing the calls. In addition, in the end nodes, e.i. originator and destination nodes, the switching tables correlate the circuit user numbers with one link, for example L2 and the slot numbers on the receive and transmit legs of this link.

In the transmitting means, the medium link access manager 120 computes the link parameters, as described in above referenced patent applications, and provides event indications to finite state machine 132, EMG1, 2, 3. The link access manager also receives signal SMG3 from finite state machine 132, which is described in detail in said patent applications and will not be described here any further.

The medium link access manager 120 provides through output bus 121, the link parameters Ns, n and the slot allocation to registers 122 and 124 and to slot table 126, respectively. Since the subframes may contain circuits slots which are assigned to circuit users connected to the boundary adapter 17-1 and circuit slots which are assigned to users attached to any nodes, the content of the table is such that zeroes are stored in correspondence to the slot numbers assigned to the end users connected to the circuit boundary adapter. The function of these zeros will be explained later on.

Thus, the slot table 126 contains an indication of the slots of the subframes which are allocated to circuit users on the transmit leg of medium link such as L2.

At each subframe generation, the slot table is read and its output 128 is used in logic circuit 130 to generate packet or circuit (P or C) ENABLE signals. These determine whether the packet or circuit parts of the subframe will be employed for the call as shown in FIG. 1.

The medium access protocol is managed through finite state machine 132 which is a logic device providing control signals when specific events occur. It is connected to the output bus 121 and to three lines 133, 134 and 135 from the associated receiving means, said lines carrying the RECEIVE IDLE PATTERN, RECEIVE SYNCHRO REQUEST and the RECEIVE LOST SYNCHRO signals, respectively. Depending upon the received events, it generates on its output lines 138, 139, 140, 141 control signals: DISABLED, SEND SYNCHRO PATTERN, SEND SYNCHRO REQUEST and OPERATION, respectively. This will now be described in more detail since a complete description may be found in above referenced patent applications.

Bit counter 144 working under control of a clock 148 operating at the communcations medium link speed, counts the bits and the subframes. Counter 146 counts the subframes. The contents of counters 144 and 146 are compared with Ns and n registers 122 and 124 by comparators 147 and 149. The output 150 of comparator 147 is provided to subframe counter 146 to cause this counter to be incremented each time an equality is detected by comparator 147.

Outputs 150 and 151 of comparators 147 and 149 and output 128 of slot table 126 are provided to logic 130 to generate the P ENABLE, C ENABLE and FLAG ENABLE signals at the correct times to build the complex frame to be sent on transmit leg of medium link L2.

Logic 130 also receives the OPERATION control signal from finite state machine 132.

Flag and r sending logic control circuit 156 working under control of T-pulse counter 157, medium link bit clock 148 and outputs 151 of comparator 149 allows specific patterns to be sent on the medium link at given instants under control of the signals on output line 139, 140 and 141 of finite state machine 132. It also provides a reset counter signal on its output line 158. Output line 158 and output lines 150 and 151 of comparators 147 and 149 are provided to OR circuits 152 and 154 which provide the reset signal to bit and subframe counters 144 and 146, respectively.

Circuit 156 also generates on output line 160, an r sending control signal which is provided to logic circuit 130 so as to cause the r residual packet bits to be sent on the medium link.

The different flags are generated by circuit 156 on output lines 162, 164 and 166. Different flags have to be sent at given times. In a specific embodiment, 01111110 is the normal complex frame delimiter, abort flag 01111111 is used to request synchronization and the UCC flag is used for indicating to the receiving means that a circuit user is to be added or deleted on a call basis, as described in above referenced patent applications.

Consequently, circuit 156 generates the medium 01111110 flag under control of OPERATION and SEND SYNCHRO PATTERN signals on lines 141 and 139 from finite state machine 132.

Circuit 156 generates the specific 01111110 flag under control of SEND SYNCHRO REQUEST line 140 from finite state machine 132.

Circuit 156 generates the USER CIRCUIT CHANGE pattern UCC which is used for changing the user slots in the subframes. This pattern is changed under control of the medium access manager 120, so that circuit 156 receives the pattern to be generated on bus 121.

The flag outputs 162, 164 and 166 of circuit 156 are provided to OR circuit 172.

Circuit 156 also generates a flag sending control signal on line 168 which is provided to logic 130 and which is also used during the initialization period to prevent the idle 1111111.. configuration from being sent on the medium link during the flag sending period.

Circuit 156 generates a next slot signal on line 170 which is provided to the slot table 126 to cause the table to be scanned in order to have the P and C indication to be provided to logic 130 through output line 128 of slot table 126. This signal is also sent to the circuit boundary adapter through control bus 20.

According to the present invention, circuit 156 generate Caq VALID C and Caq VALID P signals on lines 167 and 169 which are used to gate the bits on the XMIT CIRCUIT path 28, the circuit CP path CP-1 or the packet PP path PP-1 to the medium link depending upon the Caq value.

The packet user bits from PP path PP-1, the circuit user bits from CP path CP-2 or from the XMIT CIRC path 26, or the specific patterns from the output of OR circuit 172 are transmited on transmit leg of medium link L2 at specific instants to build the complex frames through the gating arrangement 157 and circuits OR 180 and 182 and AND gate 178, shown in FIG. 10-A.

AND gate 178 receives the FLAG enable signal from output line 188 of circuit 130 and the specific flag patterns from the output of OR circuit 172.

OR circuit 182, upon receiving the DISABLED signal from output line 138 of finite state machine 132 has its output connected to OR gate 180, so as to send the idle configuration 11...111 on the medium link through AND gate 181 (FIG. 10B) and latch 183 when the DISABLED signal is active.

AND gate 194, upon receiving the OPERATION signal from line 141 inverted by inverter 192 and the flag sending control signal from line 168 of circuit 156, has its output connected to OR circuit 182 to send the all mark 11...111 configuration on the medium link during the initialization period, between flags.

AND gate 174 receives on one of its inputs, the packet bits provided by the packet handling means on path PP-1. On its second input, it receives a signal which is active when Caq VALID P signal on line 169 or P ENABLE signal on line 184 are active. This conditioning signal is generated by OR gate 175 whose inputs are connected to lines 169 and 184.

The circuit switched bits are sent on the transmit leg of medium link L2 through OR circuit 176. Circuit 176 has one input connected to the output of AND gate 177 and its other input connected to the output line of AND gate 179.

AND gate 177 is conditioned by the Caq VALID C signal on line 167 and by a signal provided by comparator 187. Comparator 187 compares the value read from table 126 with zeros, so as to generate on its output line a signal which is active when the slot number is assigned to a circuit user connected to the boundary circuit adapter 17-1. When these conditions are met (Caq VALID C active and slot assigned to an end user), the circuit switched bits on the XMIT CIRC PATH 26 are transmitted by AND gate 177 to one input of OR gate 176.

AND gate 179 is conditioned by the C ENABLE signal on line 186 and the output signal from comparator 187 inverted in inverter 185. This provides to the transmit leg of link L2, the circuit switched bits from the CP path when the circuit slots are not assigned to an end user.

AND gate 198 is conditioned by the output signal from comparator 187 and by a signal on line 199 from circuit 196, which is active at the 9-bit boundaries. When conditioned, this AND gate provides the XMIT Caq from path 26 to one input of OR gate 180 so as to send the Caq bits from the end users on the transmit leg of medium link L2 at the times defined in reference to FIG. 2-C.

The outputs of AND gates 174, 178, 198 and the outputs of OR gates 176 and 182 are provided to OR circuit 180. The output of OR circuit 180 is provided to AND gate 181 which is conditioned when the communications medium link clock signal is positive, for example. The output of AND gate 181 sets latch 183 which is reset when the medium link clock signal is negative. Thus latch 183 provides on its output the bits to be transmitted on the transmit leg of medium link such as L2.

The detailed implementation of circuit 156 will be described in reference to FIG. 12.

Figure 11:
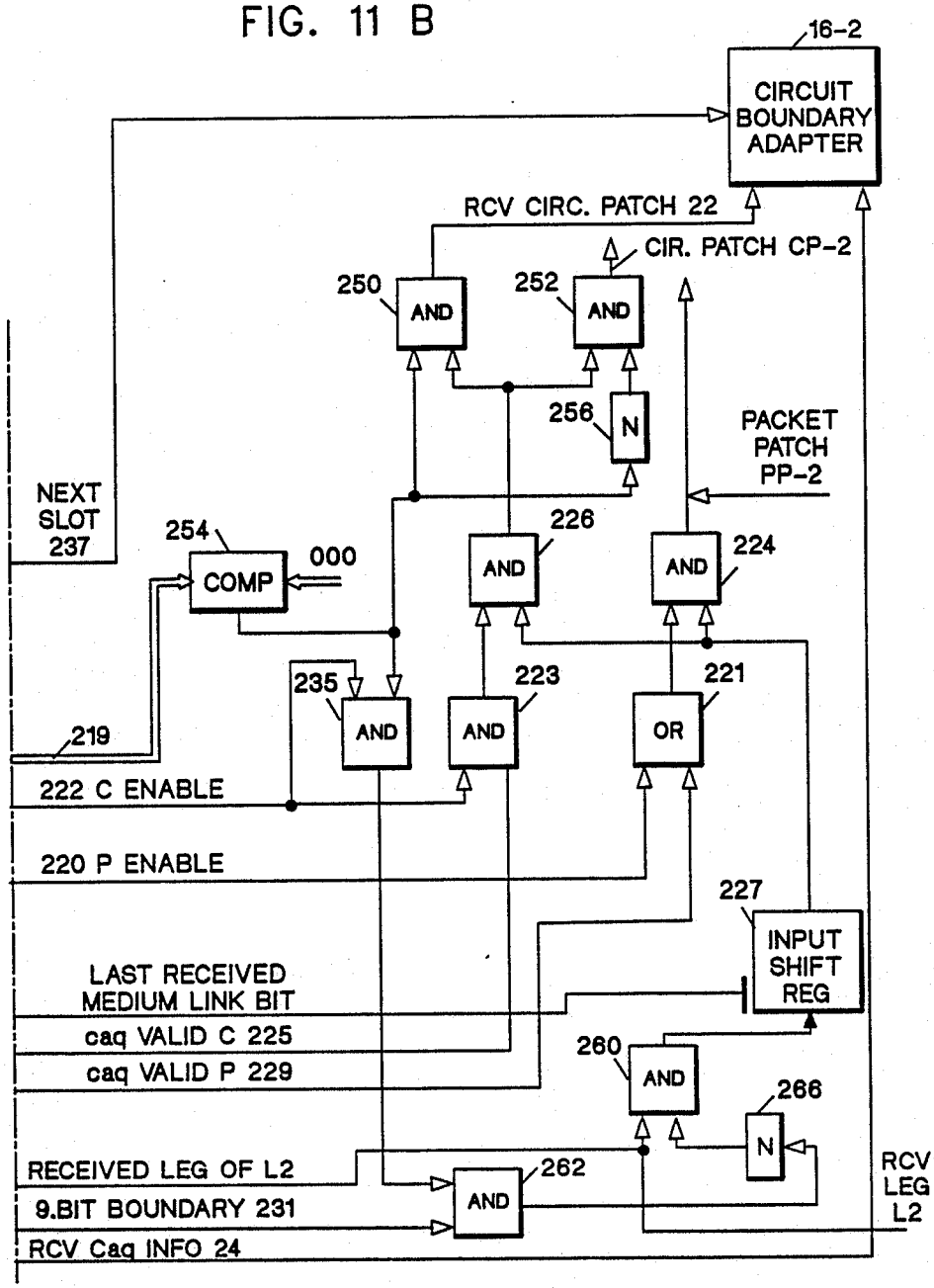
FIG. 11-A and 11-B illustrate the receive portion of the link adapter of FIG. 3.

FIGS. 11-A and 11-B shows the receiving means of the adapter such as 10-2 (FIG. 3) which receives the complex frames from the receive leg of the node inbound link, which is in this example L2.

The receiving node 2 comprises a medium access manager 200 and a finite state machine 201. Only the OPERATION output line 203 which is needed for the receiving operation is represented.

The link parameters have to be known from the receiving means. In the specific embodiment of the invention, they are found in the receiving means by consulting tables containing the correlation between Nc and the desired parameters, Nc being the number of bits received between two flags during the initialization period, i.e being an indication of the link speed.

The medium link parameters are loaded in Ns-register 202, n-register 204 and slot table 206 through output bus 201.

The receiving means comprises a bit counter 208 and a subframe counter 210. Bit counter 208 works under control of medium link clock provided by circuit 212. Comparator 214 compares the content of counter 208 and Ns-register 202 and comparator 216 compares the content of counter 210 and n-register 204 so as to generate signals on their output lines 215 and 217 which are active when an equality is detected. Output lines 215 and 217 are connected together with the output line 229 of slot table 206 to logic circuit 218. Logic circuit 218 generates P ENABLE and C ENABLE signals on output lines 220 and 222, respectively.

The C ENABLE signal is provided to one input of AND gate 223 which is conditioned by a Caq VALID C signal generated by circuit 228 on line 225 and the P ENABLE signal is provided to OR circuit 221 together with a Caq VALID P signal generated by circuit 228.

The received bits on the receive leg of link L2 in node 2 are provided to two AND gates, 224 and 226 by means of an 8-bit shift register 227. AND gates 224 and 226 are conditioned by the output signals provided by OR gate 221 and by AND gate 223.

The output of AND gate 224 is provided to the packet path PP-2.

The output of AND gate 226 is provided to one input of AND gates 250 and 252. AND gate 250 is conditioned when the circuit slots are assigned to end users. Thus the second input of AND gate 250 is connected to the output of comparator 254 which compares the information read from table 206 to zeroes. If an equality is found, the received switched bits from the medium link are sent on the RCV circuit path 22.

The output signal from comparator 254 is inverted in inverter 256, the output signal of which is provided to one input of AND gate 252. Thus when the slots are not assigned to end users, the received switched bits from the medium link are sent to the circuit path CP-2 to be transported through the network.

Circuit 228 generates the RCV Caq INFO to be sent to circuit boundary adapter 16-2 through line 24. This circuit 228 generates a signal on line 231 which is active during the 9th bit boundary time. This signal is ANDed with the output signal of AND gate 235, the result is inverted in inverter 233, and is then provided to one input of AND gate 237 together with the Receive leg of L2. AND gate 237, when conditioned, i.e. durng the 9th bit boundary period of the slots assigned to circuit users connected to adapter 17-1, prevents the 9th bit of the slot from being transmitted to the RCV circuit path. However, since it is not conditioned during the P part of the subframes or when the slots are assigned to users not connected to adapter 17-1, this 9th bit is transmitted to path PP-2 or circuit path CP-2 as the case may be.

The received bits are also provided to circuit 228 which comprises means 228-1 for detecting the flags and counting the bits in the complex frames. In normal mode of operation, i.e. after the initialization period, "r Received" output line 230 of circuit 228 is activated so as to cause the P-ENABLE signal at output of logic 218 to be activated. This enables the provision of the r residual bits to the packet switched bit handling facility through AND gate 224.

Circuit 228 also detects the UCC flags which are transmitted to the slot table through bus 232. This permits the receiving means to take into account the circuit user changes transmitted by the transmitting means and to generate the RCV UCC signal on line 236. Ti also enables generation of the next slot signal on line 237 which causes the content of slot table 206 to be scanned to cause the P and C ENABLE signals to be activated for each particular call according to the subframe configurations built. The next slot signal is provided to the circuit boundary adapter on bus 20, circuit 217 to cause the slot table 80 in this adapter to be scanned.

Circuit 228-1 generates a reset CTR signal on line 238 which is provided to OR circuits 240 and 242. The output lines of comparators 214 and 216 are also provided to OR circuits 240 and 242 whose outputs control the resetting of counters 208 and 210.

The function of shift register 227 is to delay the received bits in such a way that the flag detection may be performed in circuit 228.

Circuit 228 detects the flags in the received bits and from this flag detection and the counting of bits, part 228-2 detects when the synchronization is lost to generate the RCV LOST SYNCHRO REQUEST on lines 135 and 134. It also detects the all mark 11...111 received bit stream to generate the RCV IDLE signal on line 133. These three signals are sent to the transmitting means as shown in FIG. 10.

In as much as the present invention is embodied in the mechanisms described in above referenced patent applications, the initialization and call initiation processes are performed as described in said applications.

Circuit 156 will now be described in reference to FIG. 12.

In circuit 156, counter 157 counts the T (125 microseconds) periods. The T-pulse count at the output of counter 157 is compared with the n value provided by register 124 to comparator 300. Comparator 300 provides an active signal when an equality is detected. This active signal indicates an nT boundary. When an nT boundary is detected, latch 302 is set. The output of latch 302 and the output of medium link clock 148 are provided to AND gate 304. The output of gate 304 sets FLAG latch 306 which thus provides on its output 168 the FLAG SENDING control signal which is active at the bit clock time following an nT boundary. Latches 302 and 306 are reset by the signal on line 308 at the output of comparator 310.

Comparator 310 compares with the value 8 the content of flag or slot bit counter 312, which counts the medium link clock from 148. This counter is reset at the medium link clock pulse following at nT boundary or at the 9-bit boundaries. The 9-bit boundaries are detected by comparator 311 which compares the count provided by counter 312 with 9 and provides a signal on its output line 313 which is active at the 9-bit boundaries.

Counter 312 is reset through OR gate 316 whose inputs are the output of AND gate 304 and the output 313 of comparator 311.

Output 308 of comparator 310 is connected to the reset input of latches 302 and 306 in order to reset the latches on the 8-bit boundaries so as to provide on output 168 of latch 306 a FLAG SENDING control signal which is active during the eight-bit flag periods.

Comparator output line 308 and FLAG SENDING control line 168 are provided to AND gate 318 which thus provides the reset signal on line 158. This signal is active at the end of the flag sending period so that counters 144 and 146 (FIG. 10) are reset to zero in order to initiate the bit and subframe counting from that time.

The FLAG SENDING signal on line 168 is provided to frame counter 320 which is a one-bit counter providing and indication that the sent frame number is even or odd. This indication is required for sending normal flags or UCC flags alternatively as described in above referenced patent applications.

Latch 324 is set at the n subframe boundaries which are detected when comparator 149 (FIG. 10) detects an equality and provides an active signal on line 151 and is reset when the flag sending period begins, which is detected by comparator 300. Thus, the output of comparator 300 is provided to the reset input of latch 324, which is thus set during the r sending period and provides the r sending control signal on output 160.

AND gate 326 is connected to the output 313 of comparator 311, to FLAG SENDING line 168 through inverter 328 and to the output 160 of latch 324 through inverter 330. Thus AND gate 326 provides an active output signal on its output 170 at the 9-bit boundaries (in this embodiment of the invention, the circuit slots comprises 9 bits: 8 Cd bits +1 Caq bit), when FLAG SENDING and r SENDING control signals are inactive. Thus, AND gate 326 provides on line 170 the NEXT slot control signal which is used for scanning slot table 126 and is also provided to circuit boundary adapter 17-1 through bus 20 to cause slot table 80 in this adapter to be scanned.

The flag patterns 01111110 and 01111111 are contained in shift registers 388 and 390 and the UCC flags are loaded in shift register 332 from bus 121. The two most right bits of shift register 332 are set to 10 and the other bits indicate either the user change, if any or are set to 011111 if no user change is requested.

The shifting of registers 388, 390 and 332 is performed under control of a logic circuit comprising AND gate 334, 336 and 338. These AND gates are conditioned by the FLAG SENDING signal on line 168 and by the medium bit clock signals from 148.

AND gate 334 provides an active shifting output signal when its third input 340 is activated by means of OR gate 342 and AND gate 346. AND gate 346 provides an active signal to one input of OR gate 342 when the OPERATION line 141 from finite state machine 132 is activated and when the output of frame counter 320 is at a first value corresponding to an odd frame number, for example. The second input of OR gate receives the SEND SYNCHRO PATTERN signal from output line 139 of finite state machine 132.

When these conditions are met, the normal 01111110 flag in register 388 is provided on line 162 to be sent by AND gate 178 (FIG. 10) on the medium link.

AND gate 338 provides an active shifting output signal during the flag sending period when AND gate 348 is activated i.e. when the OPERATION signal on line 141 from finite state machine 132 is active and when frame counter 320 indicates an even frame number. Thus during this period the UCC flag is provided to AND gate 178 to be sent on the medium link.

In addition, circuit 156 comprises comparator 350 which compares the output signal provided by bit counter 312 with 1, so as to provide an active signal at each bit period.

This signal is provided to one input of AND gates 354 and 356. AND gate 354 receives on its second output the XMIT Caq INFO from path 26 as shown in FIG. 9, of the circuit boundary adapter 17-1. Inverter 358 inverts the XMIT Caq INFO and the inverted value is provided to the second input of AND gate 356.

The output signals of AND gates 354 and 356 are provided to the set inputs of latches 360 and 362. These latches are reset at the 9-bit boundaries through the output signal from comparator 311.

Through this arrangement, if the XMIT Caq INFO is at 1 during the bit period following an 8-bit boundary, the Caq VALID C signal on output line 167 of latch 360 is at 1 and if the XMIT INFO is at 0, the Caq VALID P signal on output line 169 of latch 362 is at 0.

Figure 12A:
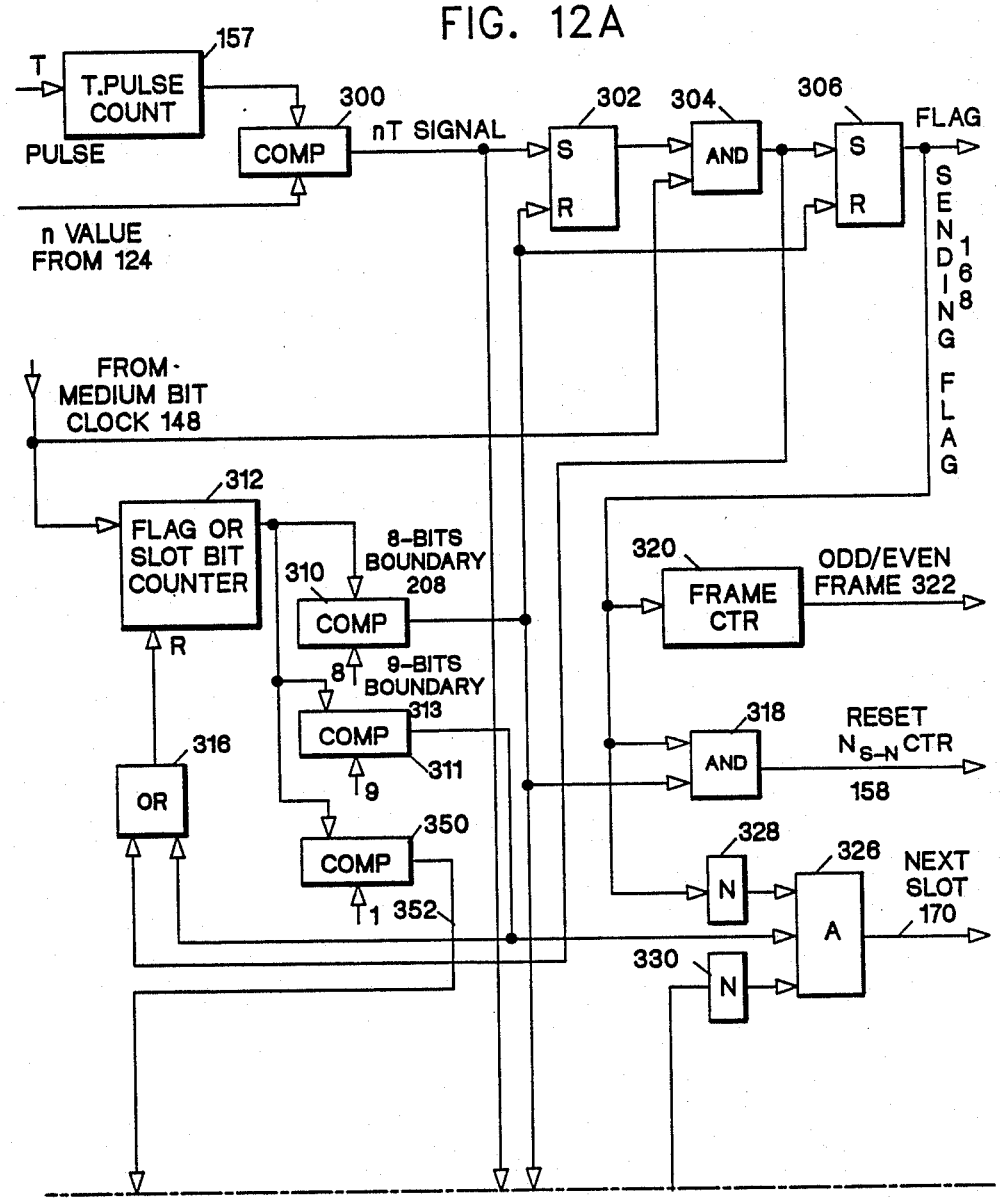
FIG. 12 illustrates circuit 156 of FIG. 10-B.
Figure 12B:
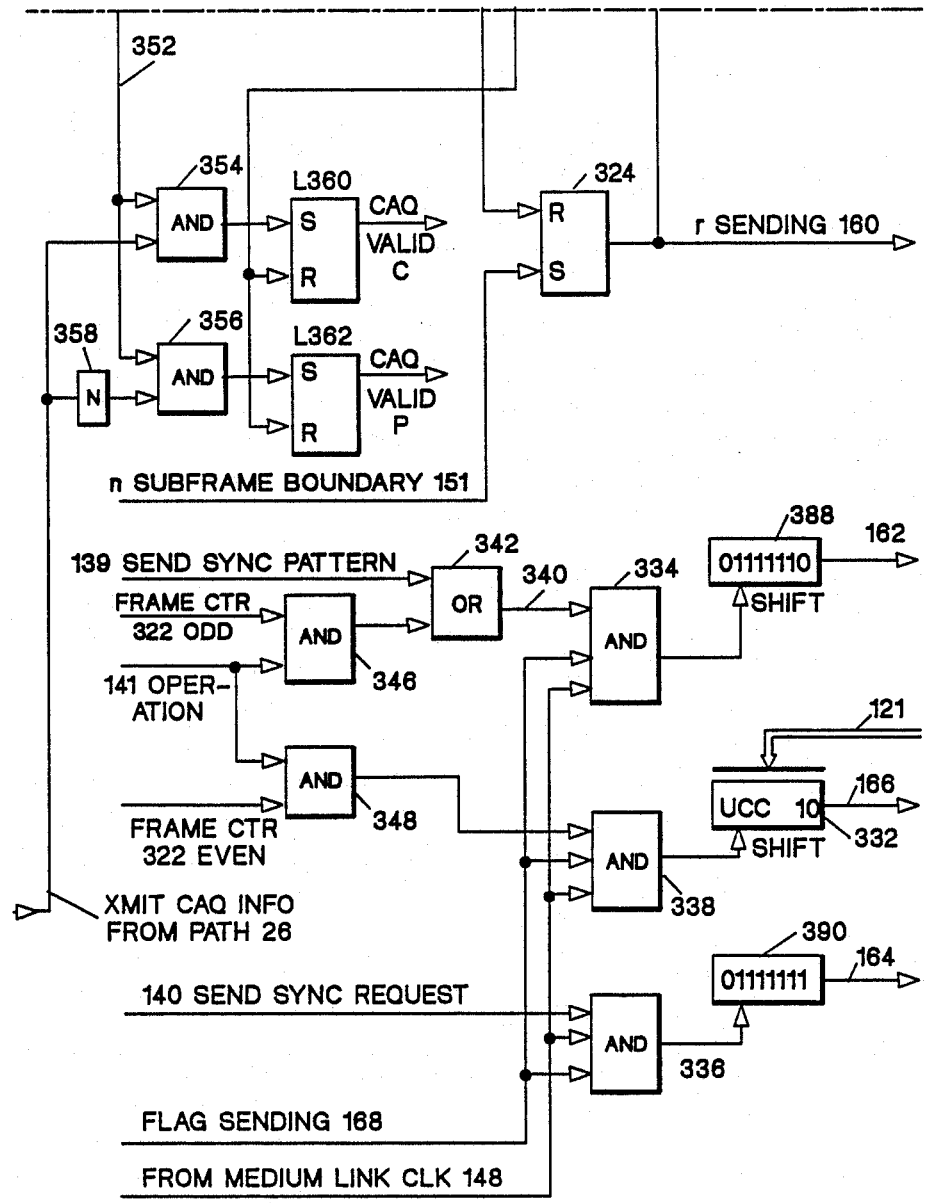

Logic circuit 157 shown in FIG. 10-A and the comparators 311, 350, the inverter 358, the AND gates 354 and 356, and the latches 360 and 362 shown in FIG. 12 comprise the transmit part of the gating means 19-1.

Figure 13A:
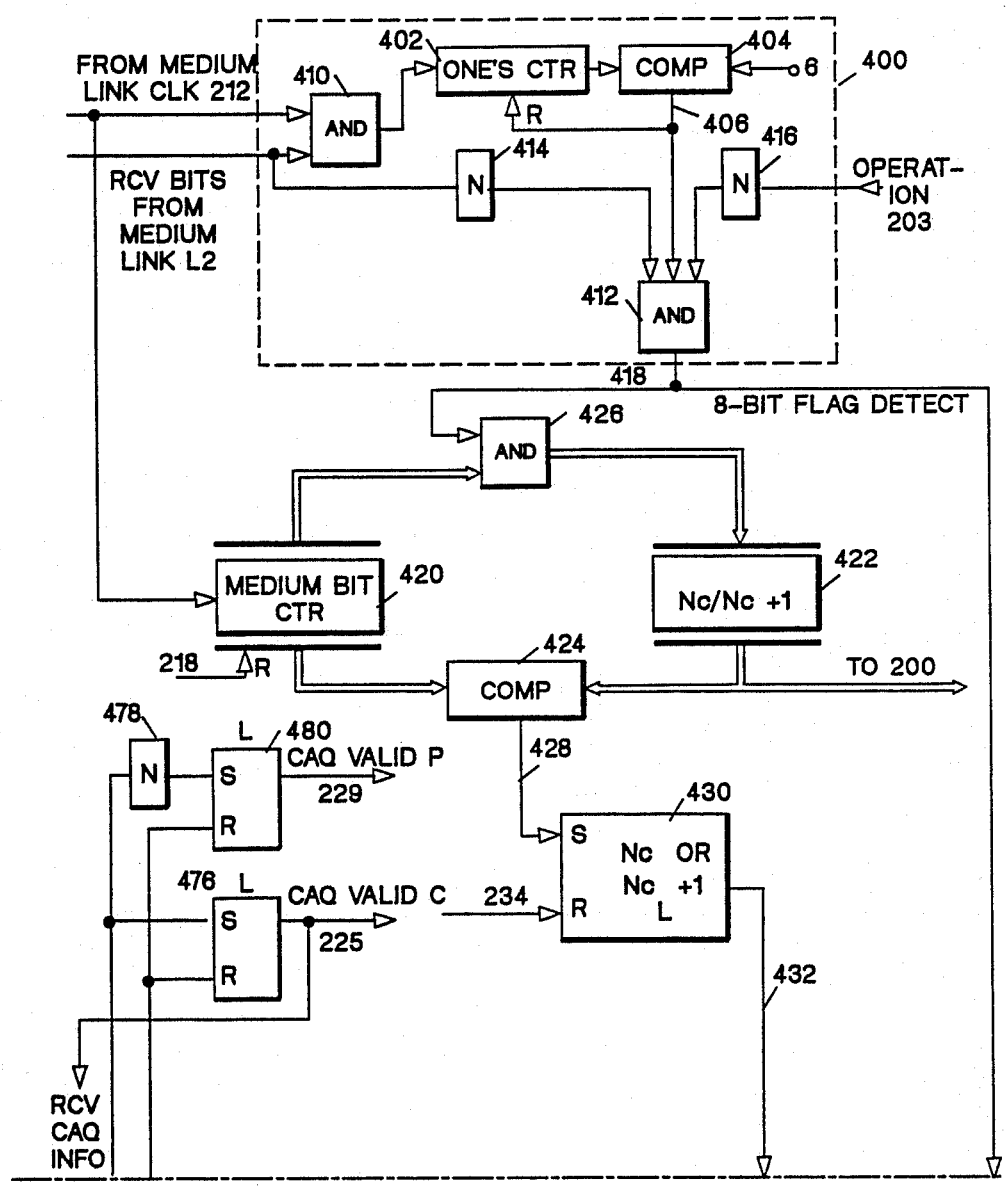
FIG. 13 illustrates circuit 218 of FIG. 11-A.
Figure 13B:
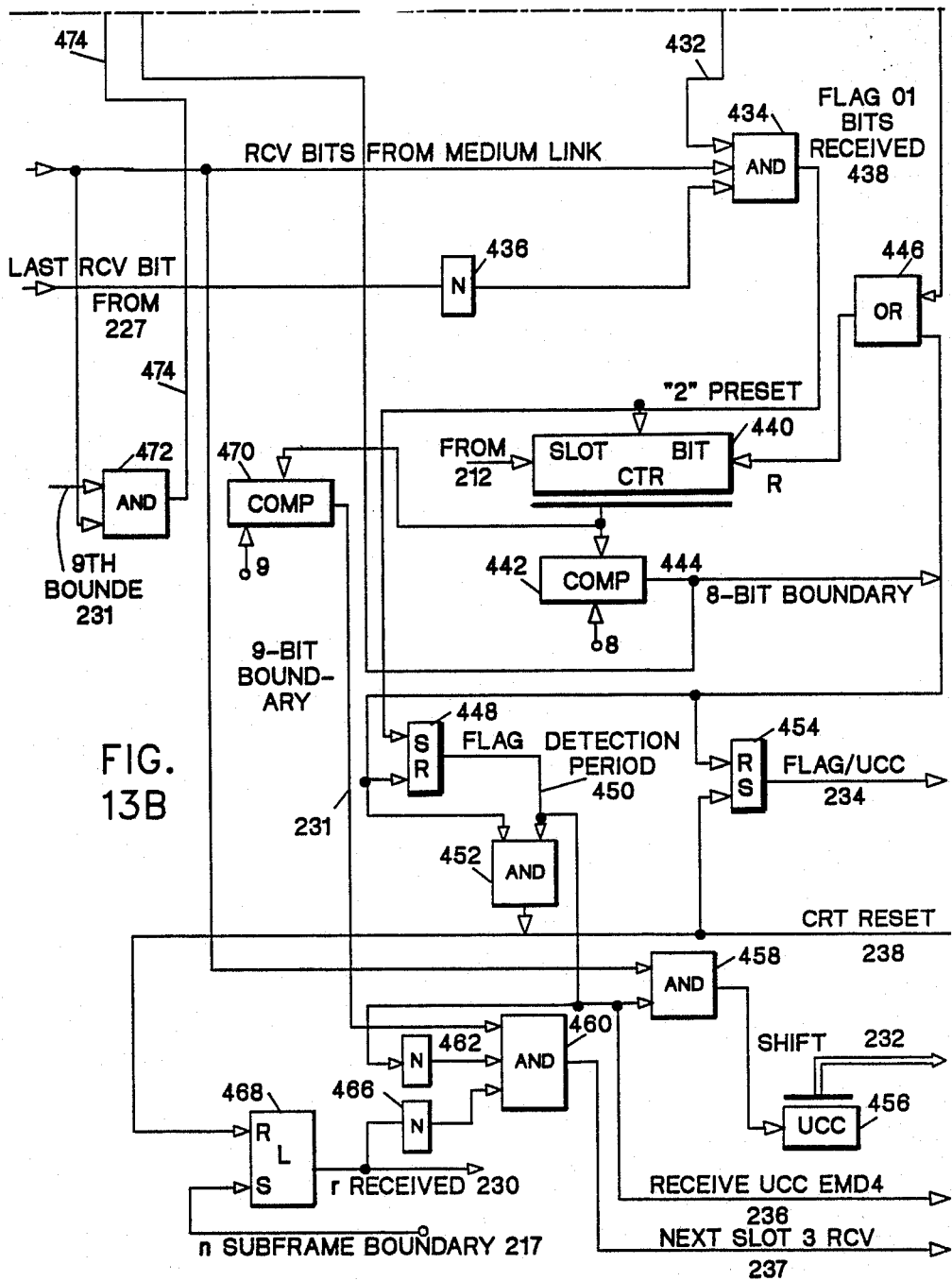

This gating means 19-2 will now be described in reference to FIG. 13, part 228-1 of the circuit 228 shown in FIG. 11.

It comprises circuit 400 which detects the flag configuration during the initialization period, i.e. when the OPERATION signal 203 from finite state machine 210 is not activated. Circuit 400 comprises one-counter 402 which counts the ones in the received bit stream. The received bit stream from the medium link is provided to AND gate 410 which also receives the medium link clock signal from 212. The output of AND gate 410 is provided to one-counter 402. Counter 402 content is compared with the value six in comparator 404 so that when six consecutive ones are found in the received bit stream, the output 406 of comparator 404 is activated and counter 402 is reset.

The output 406 is comparator 404 is provided to AND gate 412 which also receives the bit stream from the medium link, inverted in inverter 414 and the OPERATION signal from line 203 inverted in inverter 416. Thus AND gate 412 provides on its output line 418, an eight-bit flag detect signal which is activated during the initialization period when six consecutive ones followed by a zero are received.

The value Nc or Nc+1 of the complex frame bits is found during the initialization period by means of communications medium bit counter 420, Nc/Nc+1 register 422, comparator 424 and AND gate assembly 426. Counter 420 counts the medium link clock pulses from 212 and is reset by Ns and the n counter reset signal from line 238. The content of counter 420 is gated into register 422 by AND gate assembly 426 when the signal on line 418 is activated. Consequently, register 422 contains the number of complex frame bits between two flags.

The medium access manager loads the parameters calculated from Nc/Nc+1 according to the method described in above referenced patent applications, and then becomes operational.

Then register 422 content is compared with the medium bit counter content in comparator 424. This provides an output signal on line 428 which is activated when medium bit counter 420 reaches the value recorded in register 422. This active signal sets latch 430 which controls the detection of the 01 first bits of the received flag.

The output line 432 of latch 430 is provided to and gate 434 to which is also provided the received medium bits and the last received medium bit taken in register 227 (FIG. 11) and inverted in inverter 436. Consequently, AND gate 434 provides an output signal on line 438 indicating that the 01 delimiting configuration of the flag has been received. This signal is used to preset to the value 2, the slot bit counter 440. Slot bit counter counts the slot bits and its content is compared to 8 in comparator 442. Output line 444 of comparator 442 is activated when an equality is detected which indicates a 8-bit medium link boundary. Counter 440 is reset by the output of OR gate 446 which receives the 8-bit flag detect signal on line 418 and the 8-bit medium link boundary signal on line 444.

Latch 448 is set by the 2-bit delimiting pattern of the flag received on line 438 and reset by the 8-bit medium link boundary signal on line 444 so that it remains set during the six bit period after the detection of the 01 delimiting pattern of the flag.

Output line 450 of latch 448 is provided to AND gate 452 which also receives output line 444 of comparator 442. Thus, the output signal of AND gate 452 is activated to provide the n and Ns counter reset signal on line 438 during the flag detection period.

Latch 454 is set by the signal on line 238 and is reset by the 8-bit medium link boundary signal on line 444. This provides to logic 218 in FIG. 11 the FLAG/UCC period signal on line 234 which is activated during the eight bit period following the last bit of the flag. This signal is needed to compensate the delay of the received bit stream introduced by shift register 227 in FIG. 11.

During the six bit period following the 01 delimiting configuration of the flag, the received medium bits are shifted in register 456 through AND gate 458, the inputs of which are connected to the medium link and to output line 450 of latch 448. Output bus 232 of UCC register 456 is provided to medium access manager 200 and used to update slot table 206.

Output 450 of latch 448 provides the receive UCC signal on line 236 which is provided of logic 218.

Comparator 470 is connected to the output of slot bit counter 440, and compares the content of this counter with 9. This provides on its output line 231, the 9-bit boundary signal. AND gate 460 receives the 9-bit boundary signal on line 231, the flag detection period signal on line 450 inverted by inverter 462 and the r received signal on line 230 inverted in inverter 466. AND gate 460 provides on its output line 237, the NEXT SLOT signal used for scanning slot table 206 and which is provided through bus 20 to circuit boundary node 16-2 for scanning slot table 80 (FIG. 8).

According to the present invention, circuit 238 comprises AND circuit 472 which receives on a first input, the 9-bit boundary signal from line 231 and on a second input the received bits so as to generate on its output line 474 a signal which is active when the bit received on the 9-bit boundary is equal to 1.

The output line of AND gate 472 is provided to the set input of latch 476 and to the input of inverter 478. The output of inverter 478 is provided to the set input of latch 480. Latches 476 and 480 are reset by the output signal from comparator 442 which is active at the 8-bit boundaries. Thus latch 476 provides the Caq VALID C signal on line 225 and latch 480 provides the Caq VALID P signal on line 229.

The logic circuit shown in FIG. 11-A, comparator 470, AND gate 472, inverter 478 and latches 480 and 476 (FIG. 13) comprise the receive part of the gating means 18-2.

We claim:

1. A mechanism to be used in a communication network comprising boundary circuits and a plurality of nodes, including network boundary nodes connected to the boundary circuit users, for exchanging non-alphanumeric character coded information (NCI) and alphanumeric character coded information in frames comprising circuit slots which are assigned to circuit users on a per call basis for the duration of the call and the remaining part of which circuit slots are assigned to packet switched types of traffic, said nodes comprising means for transporting the circuit user data in the assigned slots from orginating users to destination users, said mechanism being characterized in that said network boundary nodes connected to boundary circuit users comprise interfacing means (30,32) comprising:

first means (30-T,32-T) for dynamically and instantaneously qualifying each of the circuit slots, said first means setting a qualifying bit to a first value indicating that a slot is assigned to a boundary circuit user or to a second value indicating that said slot is momentarily free and may be assigned to the packet switched traffic, said qualifying bits being transported through the network in correspondence with said slots that they qualify, second means (30-R,32-R) responsive to received qualifying bits and to received bits for reconstructing therefrom boundary circuit user bit streams comprising the user data bits when the qualifying bits are found equal to a first value, and to idle bit configurations when the qualifying bit is found equal to a second value;

said nodes being connected through links (L1,L2,L3) and in which said nodes comprise link-adapting means (16,17) which control the generation and reception of the frames, said mechanism further comprising:

circuit boundary adapting means attached to said link-adapting means which are connected to boundary circuit users, each circuit boundary adapting means comprising a slot table means (80,92) having a plurality of positions equal to the maximum number of circuit slots in said frames, each position storing the correspondence between a circuit slot number and the frames to be sent and received from the link and a boundary circuit user, if any, and means (156,228) for scanning said slot table means and reading a position thereof during each slot.; and decoding means (81,94) responsive to the information read from said slot table means for generating circuit user selection signals for the slots which are assigned to boundary circuit users; and first gating means (96,100) responsive to said circuit users selection signals for sending to said link adapting means the user data and the qualifying bits from said first means, for sending on the link during the assigned slots therefore, and second gating means (83,84) for sending to said second means the user data and the corresponding qualifying bits received from said link adapting means during the said slots assigned to said boundary circuit users connected to the boundary node.

2. A mechanism according to claim 1 characterized in that: the circuit user slots comprise n bits, n being an integral number, with (n−1) bits being devoted to the transportation of user data bits and with one bit being devoted to the transportation of the bit (Caq) which qualifies said slot; and wherein:

each node comprises packet switched bit handling facilities and each link adapting means comprises transmitting means (FIG. 10), receiving means (FIG. 11), and storing means (126,206) storing an indication of the circuit or packet content of the slots of the frames to be sent to and received from the link, on the call basis, said storing means being scanned to provide circuit enable signals and packet enable signals during circuit and packet parts of the frame to be sent to and received from the link, the mechanism being characterized in that:

the storing means stores a boundary user indication (zeroes) in correspondence to the slot numbers assigned to the boundary node users, the transmitting means receive from said first gating means the circuit user data bits and the associated qualifying bit during the slots assigned to boundary users, if any, and the circuit switched bits from other link adapting means, if any, and packet switched bits from packet switched bit handling facilities and which further comprises gating means (157, 354, 360, 356, 358, 362) which are responsive to the boundary user indication read from the storing means, to the boundary user qualifying bits and to the circuit and packet enable signals, for gating to the link the circuit and packet bits for building the frames, and the receiving means receives the frames from the link and comprise gating means (FIG. 11-B, 478, 480 472, 470) which are responsive to the circuit and packet enable signals, to the value of the received qualifying bit, and to the circuit user indicating to provide the received bits to the boundary circuit users or to the packet handling facilities or to propagate the circuit slots to another link adapting means in the network.

3. A mechanism according to claim 1, characterized in that:

the circuit user slots comprise n bits, n being an integral number, devoted to the transport of user data bits and the corresponding qualifying bits are grouped in the frame.

4. A mechanism according to claim 1 characterized in that:

the circuit user slot comprises n bits devoted to the transport of data bits and only one bit in a frame is devoted to the transportation of one qualifying bit, said bit in each frame being relative to a given slot number.

* * * * *